United States Patent
Okumura et al.

(10) Patent No.: US 11,291,167 B2
(45) Date of Patent: Apr. 5, 2022

(54) AGRICULTURAL GREENHOUSE, PLANT CULTIVATION METHOD USING THE SAME, AND HEAT-RAY REFLECTING FILM STRUCTURE

(71) Applicant: TOYOBO CO., LTD., Osaka (JP)

(72) Inventors: Hisao Okumura, Tokyo (JP); Yutaka Kobayashi, Nakano (JP)

(73) Assignee: TOYOBO CO., LTD., Osaka (JP)

( * ) Notice: Subject to any disclaimer, the term of this patent is extended or adjusted under 35 U.S.C. 154(b) by 749 days.

(21) Appl. No.: 16/080,379

(22) PCT Filed: Feb. 13, 2017

(86) PCT No.: PCT/JP2017/005192
§ 371 (c)(1),
(2) Date: Aug. 28, 2018

(87) PCT Pub. No.: WO2017/150165
PCT Pub. Date: Sep. 8, 2017

(65) Prior Publication Data
US 2021/0195851 A1     Jul. 1, 2021

(30) Foreign Application Priority Data

Feb. 29, 2016 (JP) .............................. JP2016-037089
Feb. 29, 2016 (JP) .............................. JP2016-037101

(51) Int. Cl.
*D04B 1/16*     (2006.01)
*D03D 15/46*     (2021.01)
(Continued)

(52) U.S. Cl.
CPC ................ *A01G 9/18* (2013.01); *A01G 9/14* (2013.01); *A01G 9/1438* (2013.01); *A01G 9/22* (2013.01);
(Continued)

(58) Field of Classification Search
CPC ..................................................... D03D 15/46
See application file for complete search history.

(56) References Cited

U.S. PATENT DOCUMENTS 3,718,533 A     2/1973     Shibata

FOREIGN PATENT DOCUMENTS

EP     0 080 961 A1     6/1983
EP     2312073 A1     4/2011
(Continued)

OTHER PUBLICATIONS

Communication dated Jan. 22, 2019 from European Patent Office in counterpart EP Application No. 17759636.8.
(Continued)

*Primary Examiner* — Jenna L Johnson
(74) *Attorney, Agent, or Firm* — Sughrue Mion, PLLC

(57) ABSTRACT

The agricultural greenhouse of the invention and the plant cultivation method using the same can cultivate plants economically and efficiently with less energy per crop yield, as it is provided with a $CO_2$ supply means, a heat-ray shielding means, and a dehumidification and cooling means, the heat-ray shielding means is formed of using a heat-ray reflecting film, and plural through holes are formed in the heat-ray shielding means. The heat-ray reflecting film structure can cultivate plants by the agricultural greenhouse utilizing sunlight economically and efficiently as it has a structure that narrow band-shaped tapes obtained by cutting a multi-layer laminated film made by laminating at least two kinds of resin layers with different refractive indices alternately and having an average transmittance at 80% or more for visible light and an average reflectance at 70% or more for heat-ray is woven or knitted as a warp or a weft.

7 Claims, 6 Drawing Sheets

(51) Int. Cl.

| | |
|---|---|
| *A01G 9/14* | (2006.01) |
| *A01G 9/18* | (2006.01) |
| *D03D 15/513* | (2021.01) |
| *A01G 9/24* | (2006.01) |
| *D03D 1/00* | (2006.01) |
| *D04B 1/22* | (2006.01) |
| *G02B 5/20* | (2006.01) |
| *G02B 5/26* | (2006.01) |
| *A01G 9/22* | (2006.01) |

(52) U.S. Cl.
CPC ............... *A01G 9/222* (2013.01); *A01G 9/24* (2013.01); *A01G 9/241* (2013.01); *A01G 9/246* (2013.01); *D03D 1/0058* (2013.01); *D03D 15/46* (2021.01); *D03D 15/513* (2021.01); *D04B 1/16* (2013.01); *D04B 1/22* (2013.01); *G02B 5/208* (2013.01); *G02B 5/26* (2013.01); *A01G 2009/1446* (2013.01); *A01G 2009/1461* (2013.01); *D10B 2505/18* (2013.01)

(56) References Cited

FOREIGN PATENT DOCUMENTS

| | | |
|---|---|---|
| EP | 2 533 318 A1 | 12/2012 |
| EP | 2868825 A1 | 5/2015 |
| GB | 2516958 A | 2/2015 |
| JP | 53-098246 A | 8/1978 |
| JP | 10-165008 A | 6/1998 |
| JP | 2963427 B2 | 10/1999 |
| JP | 2001-009996 A | 1/2001 |
| JP | 3076721 U | 4/2001 |
| JP | 2003-221750 A | 8/2003 |
| JP | 2004-176210 A | 6/2004 |
| JP | 2006-55002 A | 3/2006 |
| JP | 3917311 B2 | 5/2007 |
| JP | 2011-217681 A | 11/2011 |
| JP | 2012-206430 A | 10/2012 |
| JP | 2013-007817 A | 1/2013 |
| JP | 2013-252107 A | 12/2013 |
| JP | 2015-174406 A | 10/2015 |
| KR | 10-2014-0017935 A | 2/2014 |
| KR | 10-2014-0114089 A | 9/2014 |
| WO | 2009/053236 A1 | 4/2009 |
| WO | 2015/025513 A1 | 2/2015 |
| WO | 2015151460 A1 | 10/2015 |

OTHER PUBLICATIONS

Communication dated Feb. 25, 2020 from European Patent Office in EP Application No. 19208914.2.
International Search Report of PCT/JP2017/005192 dated Apr. 18, 2017.
Communication dated Dec. 11, 2019, from the China National Intellectual Property Administration in English Application No. 201780014140.6.
Communication dated Jul. 27, 2020 from the China National Intellectual Property Administration in Machine Application No. 201780014140.6.
Communication dated May 15, 2019, from the European Patent Office in counterpart application No. 17759636.8.
Communication dated May 2, 2019, from the European Patent Office in counterpart application No. 17759636.8.

AGRICULTURAL GREENHOUSE, PLANT CULTIVATION METHOD USING THE SAME, AND HEAT-RAY REFLECTING FILM STRUCTURE

CROSS REFERENCE TO RELATED APPLICATIONS

This is a National Stage of International Application No. PCT/JP2017/005192 filed Feb. 13, 2017, claiming priority based on Japanese Patent Application No. 2016-037089 filed Feb. 29, 2016 and Japanese Patent Application No. 2016-037101 filed Feb. 29, 2016.

TECHNICAL FIELD

The present invention relates to an agricultural greenhouse utilizing sunlight in which skylights are closed in the daytime and opened in the night-time, and also relates to a plant cultivation method using the agricultural greenhouse.

Further, the present invention relates to a heat-ray reflecting film structure used for the agricultural greenhouse utilizing sunlight.

BACKGROUND ART

Plant cultivation utilizing an agricultural greenhouse is widely carried out since the most appropriate environment for plant growth is created by controlling a surrounded space and crop yields and quality of plants can be increased. Particularly, due to a recent problem of food crisis following a population growth, various studies for efficient plant cultivation method using the agricultural greenhouse are proceeded.

Photosynthesis of plants is, as shown in a formula (1) below, a reaction of generating oxygen gas and carbohydrate from carbon dioxide absorbed from the air and water absorbed from underground and the like using light energy as a driving source. In order to cultivate plants in a large quantity and economically, sunlight is preferably utilized rather than artificial light.

$$6CO_2 + 6H_2O \rightarrow 6O_2 + C_6H_{12}O_6 \qquad (1)$$

Regarding the agricultural greenhouse utilizing sunlight, since light with wavelength of 800-1100 nm or wavelength of 800 nm-1200 nm (hereinafter, also referred to as "heat-ray" in some cases) which raises a temperature within the agricultural greenhouse is included in sunlight together with light with wavelength of 400-700 nm or wavelength of 400 nm-750 nm (hereinafter, also referred to as "visible light") utilized for plant photosynthesis, it is necessary that heat-ray is shielded to prevent a rise in temperature within the agricultural greenhouse. It is because labor and cost for ventilation, dehumidification and cooling are needed to keep a suitable temperature for plant growth (hereinafter, referred to as "suitable temperature") when the temperature in the agricultural greenhouse rises by heat-ray.

As known from the above formula (1), plant growth can be promoted by activating photosynthesis by keeping the concentration of carbon dioxide high. It is proposed in Patent Documents 1-3 that the plant growth is promoted by keeping the concentration of carbon dioxide within the agricultural greenhouse high in a plant cultivation in an agricultural greenhouse utilizing sunlight.

On the other hand, since the temperature in the agricultural greenhouse rises by sunlight in the daytime when photosynthesis is actively performed, ventilation is generally adopted as an economical means to keep an inside of the agricultural greenhouse to be a suitable temperature. For example, since the temperature in the agricultural greenhouse often becomes beyond 40° C. in a case that an amount of solar radiation is sufficient in the daytime, the temperature in the agricultural greenhouse is kept to be the suitable temperature of 20-25° C. or so, or 20-30° C. or so by natural ventilation or forced ventilation.

However, since carbon dioxide supplied into the agricultural greenhouse is released to an outside by ventilation, it is difficult to keep the concentration of carbon dioxide high while keeping the temperature in the agricultural greenhouse to be a suitable temperature, particularly in the daytime.

In Patent Document 3, it is proposed, in the daytime, to keep the concentration of carbon dioxide in plant cultivation facilities high by making the facilities a virtually sealed state and keep the temperature in the facilities to be a suitable temperature of around 20° C. using a cooling equipment. However, it is not economical to keep the temperature in large facilities to be a suitable one of around 20° C. by operating a cooling equipment in the daytime since a large amount of energy is needed.

In Patent Documents 4-7, it is described that heat-ray is shielded by laminating a synthetic resin film made of polyethylene, polyester and the like with a metal deposited layer, a metal foil, a metal containing layer and the like as an agricultural film. However, Patent Documents 4-5 and 7 describe that light is shielded by reflecting sunlight, but do not describe that visible light is transmitted. Further, Patent Document 6 describes that a laminated film has a visible light transmission property and far-infrared reflection property. However, since the laminated film reflects far-infrared radiation basically by a metal containing layer, "far-infrared reflectance (%)" is as high as "81-89%", but "visible light transmittance (%)" is as low as "50-65%" (See Examples 1-9).

PRIOR ART DOCUMENTS

Patent Documents

Patent Document 1: Japanese Patent No. 2963427B
Patent Document 2: Japanese Patent No. 3917311B
Patent Document 3: Japanese Patent Publication No. S53-098246A
Patent Document 4: Japanese Patent Publication No. 2001-009996A
Patent Document 5: Japanese Patent Publication No. 2004-176210A
Patent Document 6: Japanese Patent Publication No. 2012-206430A
Patent Document 7: Japanese Patent Publication No. 2013-252107A

DISCLOSURE OF THE INVENTION

Problem to be Solved by the Invention

An objective of the present invention is to provide an agricultural greenhouse by which plants can be economically and efficiently cultivated with less energy per crop yield of the plants and plants can be cultivated even in a dry region with less water supply to the plants, and also to provide a plant cultivation method using the agricultural greenhouse.

The other objective of the present invention is to provide a heat-ray reflecting film structure used for an agricultural greenhouse utilizing sunlight and by which plants can be economically and efficiently cultivated.

Means to Solve the Problem

The above problems regarding an agricultural greenhouse and the plant cultivation method using the agricultural greenhouse of the present invention is resolved by the agricultural greenhouse utilizing sunlight in which skylights provided on a ceiling part are closed in the daytime and the skylights provided on the ceiling part are opened in the night-time, in which at least a $CO_2$ supply means supplying carbon dioxide, a heat-ray shielding means and a dehumidification and cooling means cooling an inside of the agricultural greenhouse, the heat-ray shielding means is formed using a heat-ray reflecting film having an average transmittance at 80% or more for light with wavelength of 400-700 nm at and an average reflectance at 70% or more for light with wavelength of 800-1200 nm, and a plurality of through holes are formed in the heat-ray shielding means at a predetermined interval, and the problems are also resolved by a plant cultivation method using the agricultural greenhouse.

The above problems regarding a heat-ray reflecting film structure of the present invention is resolved by the heat-ray reflecting film structure used for an agricultural greenhouse utilizing sunlight, which is formed of a woven or knitted fabric obtained by weaving or knitting a narrow band-shaped tape as a warp or a weft and a filament yarn or a spun yarn as a weft or a warp, in which the narrow band-shaped tape is obtained by cutting an original film on which a lubricity-attached layer is provided on at least one surface of a multi-layer laminated film made by laminating at least two kinds of resin layers with different refractive indices alternately and having an average transmittance at 80% or more for light with wavelength of 400-750 nm and an average reflectance at 70% or more for light with wavelength of 800-1100 nm, and a thickness of the filament yarn or the spun yarn is 0.01-0.30 times as thick as a width of the narrow band-shaped tape and intervals between the adjacent narrow band-shaped tapes are 0.1-0.5 times the width of the narrow band-shaped tape.

The inventors of the present invention proposed an agricultural greenhouse as shown in FIG. 5 (hereinafter, referred to as "aforementioned agricultural greenhouse") as the one which can keep the concentration of carbon dioxide in the agricultural greenhouse high and can also keep an inside of the agricultural greenhouse to be a suitable temperature economically. They won "Agricultural and Food Industry Innovation Awards" by Japanese Society of Agricultural Informatics on March 2011.

The aforementioned agricultural greenhouse has following characteristics as shown in FIG. 5.

a) A ceiling part 101 and a cultivation part 102 of the agricultural greenhouse are heat insulated and comparted with "Sunny Coat 103" which is a transparent resin plate.

b) "Near-infrared ray absorbing film 104" is spread above "Sunny Coat 103", thereby about 70% of light with wavelength of 800 nm or more which is included in sunlight 108 and raises a temperature in the cultivation part 102 is absorbed and shielded, while about 70% of light with wavelength of 400-700 nm which is included in sunlight 108 and is necessary for growing the plants can be transmitted.

c) Rise of temperature due to heat generation of "near-infrared ray absorbing film 104" is prevented by ventilation of air via skylights 105 provided on the ceiling part 101.

d) The concentration of carbon dioxide is kept high by providing a "$CO_2$ generator 106" and the temperature is kept to be a suitable one by providing a "heat pump 107" in the cultivation part 102.

As above, in the agricultural greenhouse previously proposed by the inventors, the ceiling part and the cultivation part of the agricultural greenhouse is heat insulated and comparted by "Sunny Coat" which is a transparent resin plate. Therefore, the concentration of carbon dioxide in the cultivation part is kept high economically since carbon dioxide does not leak from the cultivation part. Further, the rise of the temperature in the cultivation part can be prevented since the heat generated in "near-infrared ray absorbing film" is released from the ceiling part which is heat insulated and comparted from the cultivation part to an outside via the skylights provided on the ceiling part.

Regarding the agricultural greenhouse utilizing sunlight which keeps the high concentration of carbon dioxide in the agricultural greenhouse economically by closing the skylights in the daytime and decreases the temperature in the agricultural greenhouse by opening the skylights in the night-time, the inventors found that plants can be more economically and efficiently cultivated compared with the aforementioned agricultural greenhouse by using a heat-ray shielding means having particular structures and properties instead of using "Sunny Coat" and "near-infrared ray absorbing film" of the aforementioned agricultural greenhouse, then achieved the present invention of the agricultural greenhouse and the plant cultivation method using the agricultural greenhouse.

In addition, regarding the agricultural greenhouse utilizing sunlight, the inventors found that plants can be more economically and efficiently cultivated compared with the aforementioned agricultural greenhouse by using a heat-ray reflecting film structure having particular structures and properties instead of using "Sunny Coat" and "near-infrared ray absorbing film" of the aforementioned agricultural greenhouse, then achieved the present invention of the heat-ray reflecting film structure.

The invention is summarized as below.

(1) An agricultural greenhouse utilizing sunlight in which skylights provided on a ceiling part are closed in the daytime and the skylights provided on the ceiling part are opened in the night-time, in which at least a $CO_2$ supply means supplying carbon dioxide, a heat-ray shielding means and a dehumidification and cooling means cooling an inside of the agricultural greenhouse are provided inside the agricultural greenhouse, the heat-ray shielding means is formed using a heat-ray reflecting film having an average transmittance at 80% or more for light with wavelength of 400-700 nm and an average reflectance at 70% or more for light with wavelength of 800-1200 nm, and a plurality of through holes are formed in the heat-ray shielding means at a predetermined interval.

(2) The agricultural greenhouse according to (1) above, in which the heat-ray reflecting film is a multi-layer laminated film made by laminating at least two kinds of resin layers with different refractive indices alternately.

(3) The agricultural greenhouse according to (2) above, in which at least one of the two kinds of resin layers of the multi-layer laminated film is a resin layer made of resin having a condensed aromatic ring.

(4) The agricultural greenhouse according to any one of (1) to (3) above, in which an aperture ratio of the plurality of through holes to be provided in the heat-ray shielding means is in a range from 0.5% to 10%.

(5) The agricultural greenhouse according to any one of (1) to (4) above, in which the heat-ray shielding means has a structure in which through holes are drilled on the heat-ray reflecting film.
(6) The agricultural greenhouse according to any one of (1) to (4) above, in which the heat-ray shielding means has a knitted or woven structure using a narrow band-shaped tape obtained by cutting the heat-ray reflecting film into a narrow band shape as a warp and/or a weft, and through holes are formed between the warps and/or the wefts.
(7) The agricultural greenhouse according to any one of (1) to (6) above, in which a transmittance of light with wavelength of 350 nm of the heat-ray reflecting film is 10% or less.
(8) The agricultural greenhouse according to any one of (1) to (7) above, in which the heat-ray reflecting film has an ultraviolet absorbing layer on at least one side of an outermost layer.
(9) The agricultural greenhouse according to (8) above, in which the ultraviolet absorbing layer contains a binder resin and the binder resin is a fluorine resin.
(10) The agricultural greenhouse according to any one of (1) to (9) above, in which the agricultural greenhouse is used for cultivation of fruits and vegetables which perform photosynthesis by sunlight.
(11) A plant cultivation method using the agricultural greenhouse according to any one of (1) to (10) above, in which the concentration of carbon dioxide is adjusted by closing skylights provided on a ceiling part in the daytime and a temperature is adjusted by opening the skylights provided on the ceiling part in the night-time, and plants are cultivated by controlling the temperature in the agricultural greenhouse to be 35° C. or lower, the concentration of carbon dioxide to be from 500-1500 ppm and a humidity deficit to be 4 g/m$^3$ or smaller, at least in the daytime.
(12) A heat-ray reflecting film structure used for an agricultural greenhouse utilizing sunlight, which is formed of a woven or knitted fabric weaving or knitting a narrow band-shaped tape as a warp or a weft and a filament yarn or a spun yarn as a weft or a warp, in which the narrow band-shaped tape is obtained by cutting an original film in which a lubricity-attached layer is provided on at least one surface of a multi-layer laminated film made by laminating at least two kinds of resin layers with different refractive indices alternately and having an average transmittance at 80% or more for light with wavelength of 400-750 nm and an average reflectance at 70% or more for light with wavelength of 800-1100 nm, and in which a thickness of the filament yarn or the spun yarn is 0.01-0.30 times as thick as a width of the narrow band-shaped tape and intervals between the adjacent narrow band-shaped tapes are 0.1-0.5 times the width of the narrow band-shaped tape.
(13) The heat-ray reflecting film structure according to (12) above, in which an ultraviolet absorbing layer is provided on at least one surface of the multi-layer laminated film.
(14) The heat-ray reflecting film structure according to (13) above, in which the ultraviolet absorbing layer contains a binder resin and the binder resin is a fluorine resin.
(15) The heat-ray reflecting film structure according to any one of (12)-(14) above, in which an aperture ratio of the heat-ray reflecting film structure is from 10% to 30%, and the transmittance of light with wavelength of 350 nm is from 7% to 21%.
(16) The heat-ray reflecting film structure according to any one of (12)-(15) above, in which a resin layer having high refractive index of the multi-layer laminated film is a resin layer made of resin having a condensed aromatic ring.
(17) The heat-ray reflecting film structure according to any one of (12)-(16) above, in which a difference of average refractive indices between the two kinds of resin layers of the multi-layer laminated film in an in-plane direction is at least 0.03.
(18) The heat-ray reflecting film structure according to any one of (12)-(17) above, in which the multi-layer laminated film has at least 101 layers of resin layers with an optical thickness of 150-400 nm.

Effects of the Invention

In the agricultural greenhouse and the plant cultivation method using the agricultural greenhouse, the agricultural greenhouse can be in a sealed state by closing the skylights provided on the ceiling part in the daytime when photosynthesis is actively performed, thereby the temperature, the concentration of carbon dioxide and the humidity in the agricultural greenhouse can be kept and controlled within a range where photosynthesis can be actively performed. Moreover, by using heat-ray shielding means formed using the heat-ray reflecting film having high transmittance for visible light and high reflectance for heat-ray, energy cost can be reduced without preventing the plant growth.

In the night-time when photosynthesis is not actively performed, the temperature in the agricultural greenhouse can be lowered by opening the skylights provided on the ceiling part for an upcoming rise of temperature in the next daytime. Further, by using the heat-ray shielding means in which a plurality of through holes are formed on the heat-ray reflecting film at a predetermined interval, air at a lower part of the agricultural greenhouse heated in the daytime can be released to an outside through the heat-ray shielding means. Moreover, even in a case that air in an upper part close to a roof is cooled in the night-time, particularly early in the morning, quality deterioration such as discoloration and deterioration of fruits, leaves and flowers of the plants due to condensation occurred on a lower surface of the heat-ray shielding means and dropped on the plants or deterioration of the film itself can be prevented.

In the agricultural greenhouse and the plant cultivation method using the agricultural greenhouse of the present invention, since moisture in the agricultural greenhouse becomes hard to be released to the outside by closing the skylights provided on the ceiling part in the daytime, an amount of water supply to the plants can be reduced and the plants can be cultivated even in dry regions and the like.

In the agricultural greenhouse and the plant cultivation method using the agricultural greenhouse, by using the heat-ray shielding means in which a plurality of through holes are formed at a predetermined interval, ultraviolet transmittance can be adjusted within a range where a coloring of fruits and pollination by bees are not prevented while deterioration of the heat-ray reflecting film by ultraviolet is prevented.

Since the heat-ray reflecting film structure of the present invention is formed using the multi-layer laminated film with high transmittance of visible light and high reflectance of heat-ray, a rise of temperature in the agricultural greenhouse can be suppressed without preventing the plant growth.

The heat-ray reflecting film structure of the present invention is a woven or knitted fabric weaving or knitting a narrow band-shaped tape obtained by cutting an original film in which a lubricity-attached layer is provided on both surfaces of the multi-layer laminated film as a warp or a weft and a filament yarn or a spun yarn (hereinafter, also referred to as "filament yarn and the like") as a weft or a warp. Therefore, weaving or knitting can be smoothly and homogenously performed. Further, compared to a case of using a multi-layer laminated film as it is, mechanical strength such as winding property, blocking resistance, tear resistance and durability can be excellent. Moreover, air permeability can be secured by openings formed between the narrow band-shaped tape and the filament yarn and the like.

Further, in the heat-ray reflecting film structure of the present invention, a width of the narrow band-shaped tape of the woven or knitted structure, an interval between the adjacent filament yarns and the like and an interval between the adjacent narrow band-shaped tapes is set to be in a particular range, thereby an aperture ratio can be in an appropriate range, and transmittance of light with wavelength of 350 nm (hereinafter, referred to as "ultraviolet" in some cases) can be within an appropriate range while high transmittance of visible light and reflectance of heat-ray not inferior to a case of using the multi-layer laminated film as it is can be secured.

MODE FOR CARRYING OUT THE INVENTION

Hereinafter, Embodiments of the present invention are specifically explained referring to drawings. However, the invention is not limited thereto.

Figure 5:
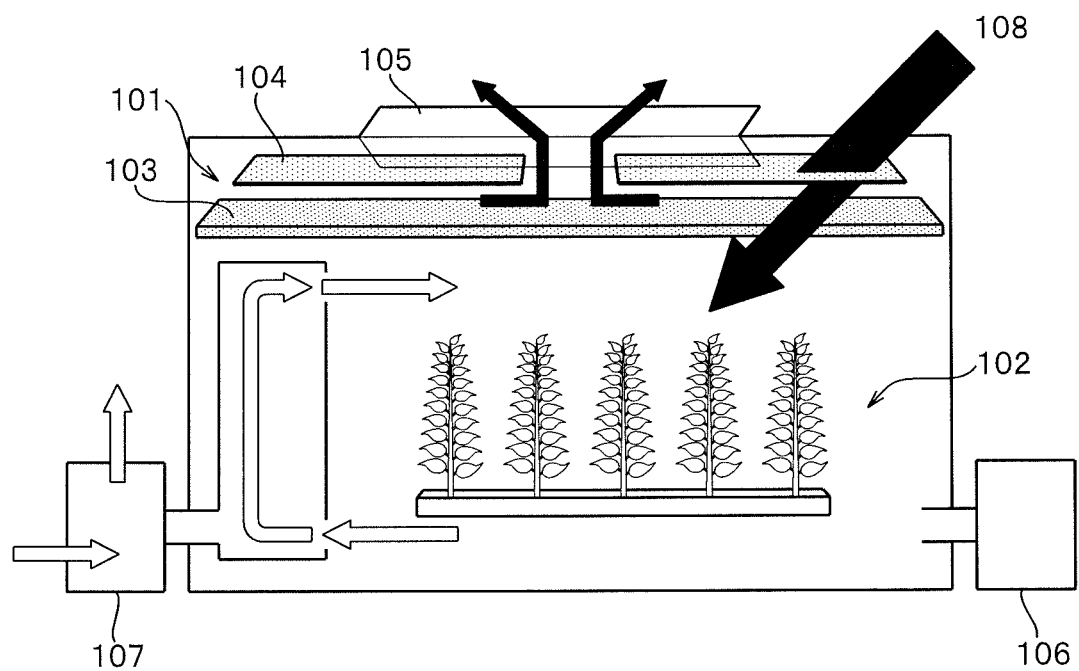
FIG. 5 is a schematic view illustrating the aforementioned agricultural greenhouse (which the inventor of the present invention proposed and for which they won Agricultural and Food Industry Innovation Awards).

FIG. 5 is a schematic view illustrating the aforementioned agricultural greenhouse. As explained above, a ceiling part 101 and a cultivation part 102 of the agricultural greenhouse are heat insulated and comparted with "Sunny Coat 103" which is a transparent resin plate, thereby the high concentration of carbon dioxide in the cultivation part 102 is kept economically. At the same time, the temperature in the cultivation part 102 is prevented from rising by releasing the heat generated in "near-infrared ray absorbing film 104" from the ceiling part 101 heat insulated and comparted from the cultivation part 102 to an outside via skylights 105.

A. Regarding the Agricultural Greenhouse and a Plant Cultivation Method Using the Agricultural Greenhouse First, the agricultural greenhouse and the plant cultivation method using the agricultural greenhouse of the present invention are explained.

Figure 1:
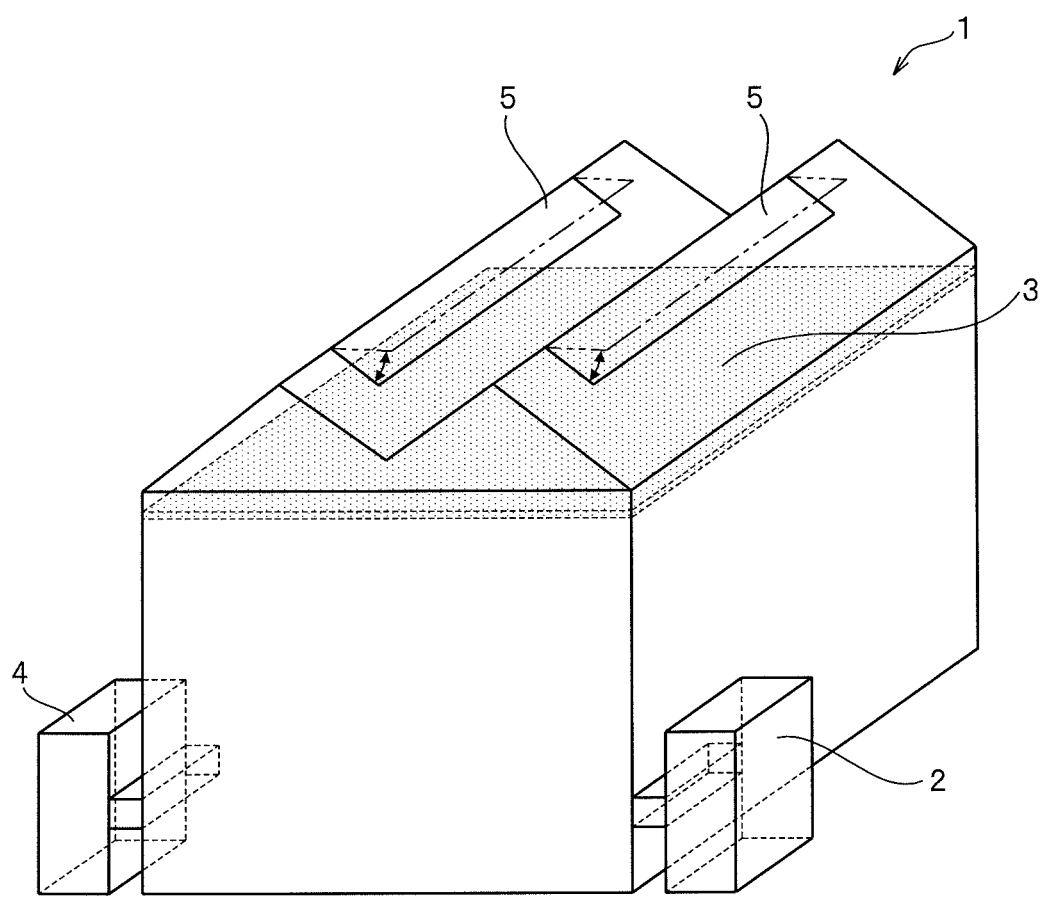
FIG. 1 is a schematic view illustrating an example of an agricultural greenhouse to explain the agricultural greenhouse or the heat-ray reflecting film of the present invention.

FIG. 1 is a schematic view illustrating an example of the agricultural greenhouse to explain the agricultural greenhouse or the heat-ray reflecting film structure of the present invention. Reference number 3 expresses a heat-ray shielding means in an explanation of the agricultural greenhouse of the present invention, and also expresses the heat-ray reflecting film structure in an explanation of the heat-ray reflecting film structure of the present invention.

In the agricultural greenhouse 1 utilizing sunlight, the heat-ray shielding means 3 is spread at an upper part and a $CO_2$ supply means 2 supplying carbon dioxide to an inside of the agricultural greenhouse 1 and a dehumidification and cooling means 4 cooling the inside of the agricultural greenhouse 1 are provided at a lower part. In the agricultural greenhouse 1, skylights 5 is closed in the daytime to keep the high concentration of carbon dioxide in the agricultural greenhouse economically, and the skylights 5 are opened in the night-time to lower the temperature in the agricultural greenhouse.

The heat-ray shielding means 3 is formed using a heat-ray reflecting film having an average transmittance of light with wavelength of 400-700 nm at 80% or more and an average reflectance of light with wavelength of 800-1200 nm at 70% or more, and a plurality of through holes are formed at a predetermined interval.

In the agricultural greenhouse of the present invention, a resin plate such as "Sunny Coat" is not provided. Therefore, it has the following excellent points compared to the aforementioned agricultural greenhouse.

1) The transmittance of visible light which is necessary for the plant growth can be enhanced (in the aforementioned agricultural greenhouse in which "Sunny Coat" is provided, the transmittance of light with 400-700 nm which is necessary for the plant growth is about 70% at most, which is low rate, as mentioned above).

2) Facility cost of the agricultural greenhouse can be reduced.

3) Problems such as discoloration and deterioration of fruits, leaves and flowers of the plants due to condensation occurred on a lower surface of "Sunny Coat" and dropped on the plants caused by a large difference of temperature between the cultivation part and the ceiling part in the night-time, particularly early in the morning.

In the aforementioned agricultural greenhouse, "near-infrared ray absorbing film" is used to shield heat-ray included in the sunlight. In such a heat-ray absorbing type film, the film itself generates heat by absorption of heat-ray and raises the temperature in the agricultural greenhouse. On the other hand, a film of heat-ray reflecting type which is "heat-ray reflecting film with an average reflectance at 70% or more for light with wavelength of 800-1200 nm" is used in the agricultural greenhouse of the present invention, which is less likely to raise the temperature in the agricultural greenhouse.

A-1. Agricultural Greenhouse

<Agricultural Greenhouse>

Next, the agricultural greenhouse of the present invention is explained in series.

The agricultural greenhouse of the present invention utilizes sunlight. When artificial light such as LED is used, an amount of light energy which is a driving source of photosynthesis can be adjusted and controlled. However, it is not suitable for mass production of the plants since irradiation energy is necessary.

In the agricultural greenhouse utilizing sunlight, since sunlight includes heat-ray which raises the temperature in the agricultural greenhouse as well as visible light which is necessary for plant growth, ventilation such as natural ventilation or forcible air blow is generally adopted as an economical cooling means. However, ventilation requires labor and cost, and tends to cause pests enter into the agricultural greenhouse.

In the agricultural greenhouse which keeps the concentration of carbon dioxide high, it is necessary that ventilation rate is kept low so as not carbon dioxide to be released to an outside as much as possible. For this purpose, the large agricultural greenhouse has to be kept at a suitable temperature by operating cooling facilities in the daytime, which requires a huge amount of energy for cooling.

In the agricultural greenhouse of the present invention, the agricultural greenhouse is in a sealed state by closing the skylights provided on the ceiling part in the daytime when photosynthesis is actively performed, and the concentration of carbon dioxide in the agricultural greenhouse are kept and controlled within a range where photosynthesis can be actively performed with a $CO_2$ supply means supplying $CO_2$. At the same time, the temperature and humidity in the agricultural greenhouse are kept and controlled within a range where photosynthesis is actively performed with a dehumidification and cooling means, thereby the plants can be efficiently cultivated.

Further, by using the heat-ray reflecting film having high average transmittance at 80% or more for visible light and high average reflectance at 70% or more for heat-ray as the heat-ray shielding means, a rise of the temperature in the agricultural greenhouse is prevented without inhibiting the plant growth and the energy cost for keeping suitable temperature can be reduced.

In the agricultural greenhouse of the present invention, the temperature in the agricultural greenhouse is lowered for an upcoming rise of the temperature in the next daytime by opening the skylights provided on the ceiling part in the night-time when photosynthesis is not performed. Further, air at a lower part of the agricultural greenhouse heated in the daytime can be released to an outside via the heat-ray shielding means by forming a plurality of through holes in the heat-ray reflecting film at a predetermined interval. Moreover, even in a case that air in an upper part close to a roof is cooled in the night-time, particularly early in the morning, quality deterioration such as discoloration and deterioration of fruits, leaves and flowers of the plants due to condensation occurred on a lower surface of the heat-ray shielding means and dropped on the plants or deterioration of the film itself can be prevented.

<$CO_2$ Supply Means>

As a $CO_2$ supply means supplying carbon dioxide to an inside of the agricultural greenhouse, several kinds of known means can be used to be provided inside the agricultural greenhouse of the present invention. For example, means which neutralizes carbonate or bicarbonate with acid, means which burns hydrocarbon and the like, or means which uses liquid carbon dioxide gas are listed. However, means which burns LP gas or liquid natural gas is preferably used since it is economical and they contain less impurities.

<Dehumidification and Cooling Means>

As a means cooling an inside of the agricultural greenhouse which is to be provided inside the agricultural greenhouse of the present invention, a dehumidification and cooling means such as heat exchange by a heat pump is used.

For cooling an inside of the agricultural greenhouse, a fine mist cooling means cooling by spraying fine mist and utilizing evaporative cooling at the time of evaporation is generally used. However, in the agricultural greenhouse such as the present invention which is closed in the daytime, cooling can not be performed using fine mist cooling means, since water vapor becomes saturated due to the lack of ventilation and fine mist does not evaporate.

<Heat-Ray Shielding Means>

[Heat-Ray Reflecting Film]

The first characteristic of the heat-ray shielding means used for the agricultural greenhouse of the present invention is that it is formed using a heat-ray reflecting film used in the field of optical interference filters and laminated glasses instead of films reflecting not only heat-ray but also visible light by a metal in a metal deposited layer, a metal foil, or a metal containing layer as used for general agricultural greenhouses.

Specifically, the heat-ray reflecting film has a high average transmittance at 80% or more for visible light included in sunlight and a high average reflectance at 70% or more for the heat-ray included in sunlight. Here, visible light means light with wavelength of 400-700 nm, and the heat-ray means light with wavelength of 800-1200 nm.

By using the heat-ray reflecting film with high average transmittance at 80% or more for visible light, visible light as a driving source of photosynthesis can be sufficiently supplied to plants, thereby the plant growth can be sufficiently promoted.

Further, by using the heat-ray reflecting film with high average reflectance at 70% or more for heat-ray, the heat-ray which raise the temperature in the agricultural greenhouse can be sufficiently shielded. Moreover, since the film itself is less likely to generate heat such as in the heat-ray absorbing film, rise of the temperature in the agricultural greenhouse can be suppressed and cost for dehumidification and cooling can be lowered.

As the heat-ray reflecting film with high average transmittance for visible light and high average reflectance for heat-ray, multi-layer laminated films as below can be appropriately used;

a polyester multi-layer optic film, used for an optic interference filter as described in JPH9-506837A, a film including a multi-layer polymer film and a transparent conductive body stuck on a surface of a window glass, as described in JPH11-508380A, a laminated polyester film, used by laminating to a glass in a laminated glass as described in International Publication No. 2005/040868A, a biaxially stretched laminated polyester film, used by laminating to a glass in a laminated glass as described in International Publication No. 2013/080987A, and a biaxially stretched laminated polyester film, used by laminating to a glass in a laminated glass as described in JP2014-228837A The above multi-layer laminated films are not the ones which reflect heat-ray by a metal deposited layer, a metal foil, a metal containing layer and the like as generally used in the agricultural greenhouses, but which are made by laminating at least two kinds of resin layers with different refractive indices alternately, and can transmit visible light and reflect heat-ray selectively among sunlight.

The multi-layer laminated film used for the heat-ray reflecting film of the present invention is not limited in particular as far as it has the above properties. However, it is preferable that at least two kinds of resin layers with different refractive indices are laminated alternately. Regarding a reflection by alternate lamination of resin layers with different refractive indices, reflection wavelength can be designed with an optical thickness of the resin layers (refractive index×thickness) and reflectance can be designed with a total number of resin layers and with a difference of refractive indices between the resin layers. Selection of the resin, thickness of resin layer and the number of layer to be laminated can be adjusted so as to be a desired reflection property.

As the resins forming the resin layer of the multi-layer laminated film, the known ones can be adopted. The following are listed; polyester, polysulfone, polyamide, polyether, polyketone, polyacryl, polycarbonate, polyacetal, polystyrene, polyamideimide, polyarylate, polyolefin, polyfluoro polymers, polyurethane, polyarylesulfone, polyethersulfone, polyarylene sulfur, polyvinyl chloride, polyetherimide, tetrafluoroethylene and polyether ketone. They are not limited to a homopolymer, and may be a copolymer. In addition, since a difference of refractive indices between the resin layers can be easily high, it is preferable that at least one resin layer is a resin which has a condensed aromatic ring such as naphthalene ring, by which the refractive index can be easily high, as a repeating unit, and it may exist as a copolymer content.

Among the above resins, as resins used for resin layers with high refractive index, a thermoplastic resin having crystalline is preferable since high molecular orientation is easy to be developed by drawing, and particularly a thermoplastic resin having a melting point at 200° or higher is preferable. From the above viewpoint, as a specific thermoplastic resin, polyester is preferable, and polyethylene terephthalate, polyethylene-2,6-naphthalenedicarboxylate are more preferable. Particularly, since the refractive index is high and drawing can be performed at high draw ratio, polyethlene-2,6-naphthalenedicarboxylate having a condensed aromatic ring are preferable.

On the other hand, as the resin used for resin layers with low refractive index, it is not limited in particular as far as a sufficient difference of refractive index with respect to a resin layer with high refractive index can be developed and necessary adhesion can be maintained. For example, a resin in which a resin used for a resin layer with high refractive index is copolymerized with a copolymer content which can lower a refractive index can be used. Since the refractive index is not necessary to be enhanced by drawing, an amorphous resin or a resin having sufficiently low melting point compared to the resin of the resin layer having high refractive index can be also used. For example, an amorphous polyester including ethylene terephthalate content and the like can be preferably used.

[Through Holes]

The second characteristic of the heat-ray shielding means used for the agricultural greenhouse of the present invention is that a plurality of through holes are formed in the heat-ray shielding means at a predetermined interval.

Since the heat-ray needs to be shielded sufficiently, the heat-ray shielding means used for the agricultural greenhouse of the present invention spreads over a whole upper part of the agricultural greenhouse and comparts the agricultural greenhouse into an upper part and a lower part as shown in FIG. 1, and a plurality of through holes are formed at a predetermined interval in order to secure good air permeability between the upper part and the lower part of the agricultural greenhouse.

Regarding the agricultural greenhouse of the present invention, in the night-time when photosynthesis is not performed, the skylights provided on the ceiling part are opened to lower the temperature in the agricultural greenhouse for an upcoming rise of temperature in the next daytime. Further, by forming a plurality of through holes in the heat-ray shielding means at a predetermined interval, air at the lower part of the agricultural greenhouse heated in the daytime can be released to an outside via the heat-ray shielding means. Moreover, even in a case that air in an upper part close to a roof is cooled in the night-time, particularly in the morning, quality deterioration such as discoloration and deterioration of fruits, leaves and flowers of the plants due to condensation occurred on a lower surface of the heat-ray shielding means and dropped on the plants or deterioration of the heat-ray shielding means itself can be prevented.

An aperture ratio of the plurality of through holes formed in the heat-ray shielding means is preferably within a range of 0.5-10%, and more preferably 1-5%.

An "aperture ratio" of the present invention is obtained as follows; making a part where a back surface side can be seen without interference in a case that a surface of 10 cm-by-10 cm square part (area of 100 cm$^2$) in one surface of the heat-ray shielding means is observed from a vertical direction to the surface to be an aperture; total (S cm$^2$) of an area of the apertures (aperture area) is obtained; then the aperture ratio is calculated by a formula: [S(cm$^2$)/100(cm$^2$)]×100.

In the agricultural greenhouse of the present invention, in a case that an aperture ratio is 0.5% or more, air permeability of the heat-ray shielding means becomes good, and air at a lower part of the agricultural greenhouse heated in the daytime can be released to an outside through the heat-ray reflecting film in a case that the temperature in the agricultural greenhouse is lowered for an upcoming rise of the temperature in the next daytime, by opening the skylights provided on the ceiling part in the night-time when photosynthesis is not performed. Further, it is preferable since quality deterioration such as discoloration and deterioration of fruits, leaves and flowers of the plants due to condensation occurred on a lower surface of the film and dropped on the plants or deterioration of the film itself can be prevented even in a case that air in an upper part close to a roof is cooled in the night-time, particularly early in the morning. Moreover, in a case that an aperture ratio is 1% or more, it is more preferable since air permeability of the heat-ray reflecting film becomes better.

In a case that an aperture ratio is 10% or less, it is preferable since the heat-ray reflecting function given by the heat-ray reflecting film is not greatly lowered. In addition, in a case that an aperture ratio is 5% or less, it is preferable since the deterioration of the heat-ray reflecting ability can be more limited.

As the heat-ray shielding means, the ones which has a structure that through holes are drilled on the heat-ray reflecting film can be used.

As for arrangement of the through holes, it is preferable that the through holes are drilled at a predetermined interval so as properties such as strength and stiffness of the heat-ray shielding means to be as uniform as possible. The interval between the through holes is set to be 30 cm or less, preferably 20 cm or less and more preferably 10 cm or less so as air permeability of the heat-ray shielding means to be as uniform as possible.

As a specific structure of the heat-ray shielding means, the one in which holes with a predetermined shape such as a circle, a triangle or a quadrangle are drilled on the heat-ray reflecting film at a predetermined interval simply may be sufficient. However, it is preferable that a shape of the hole is the one in which a length of the heat-ray shielding means in a width direction (that is, a direction orthogonal to a length direction) is longer than a length in the length direction so as a winding property of the heat-ray shielding means to be good since there is a case that the heat-ray shielding means are rolled away during the night-time or winter.

In order to make a winding property, blocking resistance, tear resistance and durability and the like to be good, it is more preferable that the heat-ray shielding means is a woven or knitted fabric made by knitting and weaving a narrow band-shaped tape obtained by cutting the heat-ray reflecting film into a narrow-band shaped tape as a warp and/or a weft than it is formed of one sheet of the heat-ray reflecting film. Moreover, it is more preferable to be a woven fabric in which the narrow band-shaped tape of the heat-ray reflecting film as a warp or a weft and a transparent thread as a weft or a warp are woven. For a narrow band-shaped tape, the one obtained by cutting (slit processing) the heat-ray reflecting film to be a narrow band shape with a width of 1-50 mm, preferably 2-20 mm and more preferably 4-8 mm is used.

Figure 2A:
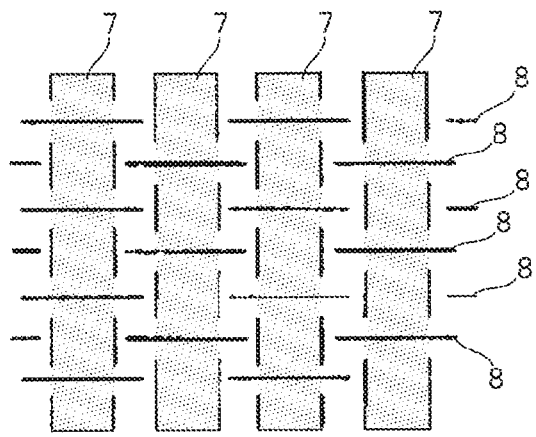
FIG. 2 is a front view illustrating a part of a fabric weaving or knitting a narrow band-shaped tape obtained by cutting a film to be a narrow band-shape as an example of a heat-ray shielding means which can be preferably used for the agricultural greenhouse of the present invention.
Figure 2B:
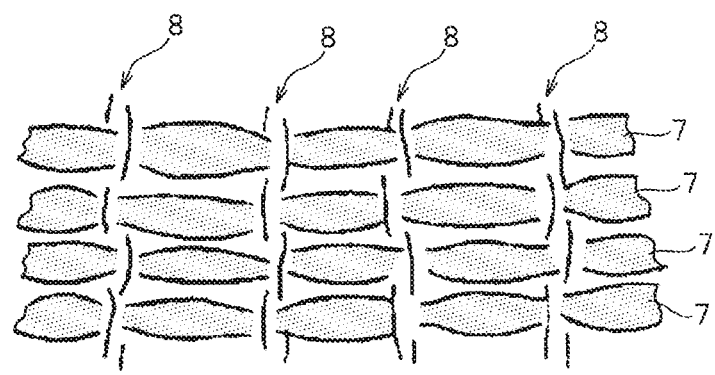
Figure 2C:
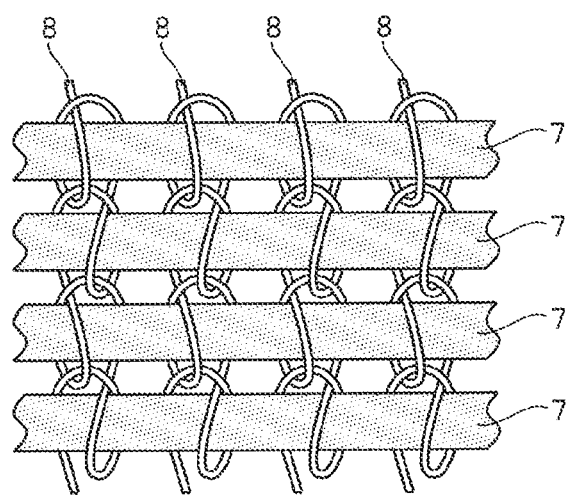

As a favorable structure of a woven or knitted fabric, the ones weaving or knitting the narrow band-shaped tape 7 with a transparent thread 8 as shown in FIGS. 2 (*a*), (*b*), (*c*) are listed. The knitted or woven fabric in FIG. 2 (*a*) is made by weaving such that the narrow band-shaped tapes 7 as a warp are set on a loom and the transparent threads 8 are weft inserted. The knitted or woven fabric in FIG. 2 (*b*) is woven with the narrow band-shaped tapes 7 as a weft and the transparent threads 8 as a warp, and the knitted or woven fabric in FIG. 2 (*c*) is knitted with the narrow band-shaped tapes 7 as a warp and the transparent threads 8 as a weft.

The through holes in the woven or knitted fabric are formed between the warps and/or the wefts. An aperture ratio of the through holes can be adjusted by a density of a warp and a weft and others.

[Ultraviolet Absorbing Layer]

The heat-ray shielding means of the present invention is exposed to sunlight in the daytime. Therefore, it is preferable that a transmittance of light with wavelength of 350 nm (hereinafter, referred to as "ultraviolet transmittance") of the heat-ray reflecting film forming the heat-ray shielding means is set to be 10% or less to prevent deterioration by the ultraviolet.

In a case that the heat-ray reflecting film includes a resin having a condensed aromatic ring such as naphthalenedi ring, the ultraviolet absorbing layer is not necessarily required to be provided since the ultraviolet transmittance of the heat-ray reflecting film becomes low naturally. However, in a case that ultraviolet transmittance of the heat-ray reflecting film is high, it is preferable that the ultraviolet transmittance is lowered by providing the ultraviolet absorbing layer on at least one side of the outermost layer of the heat-ray reflecting film.

As ultraviolet absorbers to be contained in the ultraviolet absorbing layer, ultraviolet absorbers of triazine based, benzotriazole based, benzophenone based, benzoxazinone based, cyanoacrylate based, and salicylate based can be listed, for example. Among them, triazine based ultraviolet absorbers and benzotriazole based ultraviolet absorbers can be preferably used. Specifically, examples are as follows; 2-(2-hydroxy-4-[1-octyloxycarbonylethoxy]phenyl)-4, 6-bis(4-phenylphenyl)-1,3,5-triazine, 2-(2H-benzotriazole-2-yl)-4,6-bis(1-methyl-1-phenylethyl)phenol, 2-(2H-benzotriazole-2-yl)-6-(1-methyl-1-phenylethyl)-4-(1,1,3,3-tetramethylbutyl)phenol, octyl-3-[3-tert-butyl-4-hydroxy-5-(5-chloro-2H-benzotriazole-2-yl)phenyl]propionate, 2-ethylhexyl-3-[3-tert-butyl-4-hydroxy-5-(5-chloro-2H-benzotriazole-2-yl)phenyl]propionate, 2-(2H-benzotriazole-2-yl)4,6-bis(1-ethyl-1-phenylethyl)phenol, phenol, 2-(5-chloro-2H-benzotriazole-2-yl)-6-(1,1-dimethylethyl)4-methyl, 2,2'-methylenebis[6-(2H-benzotriazole-2-yl)-4-1,1,3,3-tetramethylbutyl]phenol, 2-(4,6-diphenyl-1,3,5-triazine-2-yl)-5-[(hexyl)roxy]phenol, 2,4-bis(2-hydroxy-4-butyloxyphenyl)-6-(2,4-bis-butyloxyphenyl)-1,3,5-triazine, benzenepropanoic acid, 3-(2H-benzotriazole-2-yl)-5-(1,1-dimethylethyl)-4-hydroxy-C7-9 branched and chain alkyl ester, 2-(2-hydroxy-5-tert-methylphenyl)-2H-benzotriazole, 2-(2H-benzotriazole-2-yl)-4,6-di-tert-pentylphenol, 2,2'-dihydroxy-4-methoxybenzophenone, 2-[4,6-bis(2,4-dimethylphenyl)-1,3,5-triazine-2-yl]-5-(octyloxy)phenol, and 2-(2'-hydroxy-5'-octylphenyl)benzotriazole.

As binder resins of the ultraviolet absorbing layer, examples are as follows; polyester resin, acrylic resin, acrylic silicon resin, urethane resin, fluorine resin, silicon resin, melamine based resin, cellulose resin, polyamide resin. Among these binder resins, acrylic resin, acrylic silicon resin, urethane resin, silicon resin and fluorine resin are preferable due to its excellent light stability.

As means to provide the ultraviolet absorbing layer, a means providing the ultraviolet absorber layer on a surface of the multi-layer laminated film by co-extrusion method and a means providing the ultraviolet absorber layer by coating.

As above, in light of preventing ultraviolet degradation of the heat-ray shielding means, it is preferable that the ultraviolet transmittance is set to be low, i.e. 10% or lower. However, when the ultraviolet is shielded excessively, problems occur that fruits such as eggplants are not colored sufficiently when they are grown, or pollination activity is not performed in a normal way because bees do not approach flowers sufficiently in the agricultural greenhouse.

In a case that ultraviolet transmittance of the heat-ray shielding means is too low, the ultraviolet transmittance can be adjusted to be high as follows;

In a case that the heat-ray shielding means is the one in which the through holes are drilled on the heat-ray reflecting film, the ultraviolet transmittance can be adjusted so as the heat-ray shielding means not to shield the ultraviolet excessively by adjusting an aperture ratio by adjusting a size and a density of the through holes to be drilled.

In a case that the heat-ray shielding means is a knitted or woven fabric with the narrow band-shaped tape of the heat-ray reflecting film and a transparent thread, the ultraviolet transmittance can be adjusted so as the heat-ray shielding means not to shield the ultraviolet too excessively by adjusting an aperture ratio of the through holes formed between the narrow band-shaped tapes and/or the transparent threads by adjusting a density of the narrow band-shaped tapes and/or the transparent threads composing the knitted or woven fabric, or by using a transparent film with high ultraviolet transmittance such as polyethylene film together with the heat-ray reflecting film as a narrow band-shaped tape.

Generally, in a case that the heat-ray reflecting film includes a resin having a condensed aromatic ring such as naphthalene ring, the ultraviolet transmittance of the heat-ray reflecting film tends to be too low. Therefore, it is preferable that an area ratio of the heat-ray reflecting film occupied in the heat-ray shielding means (hereinafter, referred to as "cover ratio") is set to be 95% or lower when the surface of the heat-ray shielding means is observed from a vertical direction to the surface.

A-2. Plant Cultivation Method

The agricultural greenhouse of the present invention can be preferably used for cultivating fruits and vegetables performing photosynthesis by sunlight, for example, tomatoes, eggplants, green peppers, paprikas, cucumbers, watermelons, squashes, red peppers, green peas, broad beans, strawberries, broccolis and cauliflowers.

In the plant cultivation method using the agricultural greenhouse of the present invention, the agricultural greenhouse is to be in a sealed state by closing the skylights provided on the ceiling part in the daytime when photosynthesis is actively performed, thereby the temperature, the concentration of carbon dioxide and the humidity in the agricultural greenhouse can be kept and controlled within a range where photosynthesis is actively performed. However, it does not need to prevent that the skylights are opened temporarily in the daytime. Specifically, it is preferable that the plant is cultivated by keeping and controlling the temperature inside the agricultural greenhouse to be 35° C. or lower, the concentration of carbon dioxide to be 500-1500 ppm and the humidity deficit to be 4 $g/m^3$ or less.

The temperature inside of the agricultural greenhouse can be set corresponding to a suitable temperature and a maximum limit temperature for the plants to be cultivated. For example, the suitable temperature and the maximum limit temperature for fruits and vegetables in the daytime (expressed as "suitable temperature, maximum limit temperature") are set as follows; tomatoes [20-25° C., 35° C.], eggplants [23-28° C., 35° C.], green peppers [25-35° C., 35° C.], cucumbers [23-28° C., 35° C.], watermelons [23-28° C., 35° C.] and squashes [20-25° C., 35° C.]. From this viewpoint, it is desirable that the temperature inside the agricultural greenhouse is set to be 35° C. or lower, preferably 30° C. or lower, and more preferably 20-30° C.

Though the normal concentration of carbon dioxide in the air is about 300 ppm, the concentration of carbon dioxide inside the agricultural greenhouse is set to be 500-1500 ppm, thereby photosynthesis of the plants can be significantly promoted. When the concentration of carbon dioxide is less than 500 ppm, an effect to promote photosynthesis is not sufficient. On the other hand, when the concentration of carbon dioxide is beyond 1500 ppm, an economical advantage is limited since photosynthesis is not promoted so much.

A moisture state of plants is affected stronger by a humidity deficit (a parameter showing how much more water vapor can enter in the air at a certain temperature and a certain humidity, and a vacant amount of the water vapor per 1 $m^3$ of air is expressed as grams) than by a relative humidity. In the cultivation method of the present invention, the plant is cultivated by keeping and controlling the humidity deficit inside the agricultural greenhouse to be 4 $g/m^3$ or less by the dehumidification and cooling means.

Though the humidity deficit inside of the agricultural greenhouse can be set within a range suitable for the plants to be cultivated, when the humidity deficit becomes too large, the plants closes pores, evaporation is not performed and then photosynthesis is not actively performed generally. Therefore, it is desirable that the humidity deficit inside the agricultural greenhouse is set to be preferably 4 $g/m^3$ or less, and more preferably 3.5 $g/m^3$ or less.

When the humidity deficit becomes too small, there is not a difference of water vapor pressure between plants and air, evaporation does not occur even when the pores are opened, carbon dioxide gas is not absorbed and then photosynthesis is not actively performed. Therefore, it is desirable that the humidity deficit inside the agricultural greenhouse is set to be preferably 2 $g/m^3$ or more, and more preferably 2.5 $g/m^3$ or more.

In order to keep and control the temperature, the concentration of carbon dioxide and the humidity in the agricultural greenhouse to be within the above-mentioned range, sensors for temperature, $CO_2$ and humidity may be installed in the agricultural greenhouse, for example, and operation state of $CO_2$ supply means and the dehumidification and cooling means may be adjusted corresponding to the measured values.

The temperature, the concentration of carbon dioxide and the humidity at which photosynthesis is actively performed are different corresponding to kinds of plants, growth stage and the like. Therefore, it is desirable that target values for the temperature, the concentration of carbon dioxide and the humidity in the agricultural greenhouse are set and adjusted in detail.

As above, in the agricultural greenhouse of the present invention and the plant cultivation method using the agricultural greenhouse, the agricultural greenhouse is in a sealed state by closing the skylights provided on the ceiling part in the daytime when photosynthesis is actively performed, thereby the temperature, the concentration of carbon dioxide and the humidity in the agricultural greenhouse can be kept and controlled within a range where photosynthesis is actively performed. Moreover, it is excellent because it can reduce energy cost without inhibiting the plant growth by using heat-ray shielding means formed by using the heat-ray reflecting film which has high transmittance for visible light and high reflectance for heat-ray.

Further, in the invention, in the night-time when photosynthesis is not actively performed, the temperature in the agricultural greenhouse can be lowered for an upcoming rise of temperature in the next daytime by opening the skylights provided on the ceiling part. Further, by using the heat-ray shielding means in which a plurality of through holes are formed at a predetermined interval, air at a lower part of the agricultural greenhouse heated in the daytime can be released to an outside via the heat-ray shielding means. Moreover, it is excellent because it prevents quality deterioration such as discoloration and deterioration of fruits, leaves and flowers of the plants due to condensation occurred on a lower surface of the heat-ray shielding means and dropped on the plants or deterioration of the film itself, even in a case that air in an upper part close to a roof is cooled in the night-time, particularly early in the morning.

Further, the present invention is excellent because an amount of water supply to the plants can be reduced and the plants can be cultivated even in dry regions and the like since the moisture in the agricultural greenhouse can be hard to escape to an outside by closing the skylights provided on the ceiling part in the daytime.

Moreover, the present invention is excellent because the ultraviolet transmittance can be adjusted to an extent that a coloring of fruits or pollination by bees is not inhibited by using the heat-ray shielding means in which a plurality of through holes are formed at a predetermined interval.

B. Heat-Ray Reflecting Film Structure

Next, the heat-ray reflecting film structure of the present invention is explained.

Since the heat-ray reflecting film structure of the present invention has properties and characteristics such as high transmittance for visible light, high reflectance for heat-ray, good air permeability and the like, it can be faborably used for agricultural greenhouses utilizing sunlight, particularly the ones which promote the plant growth by keeping the high concentration of carbon dioxide in the agricultural greenhouse, as shown in FIG. 1. Particularly, it can be used as a heat-ray shielding means in the agricultural greenhouse. It should be noted that, visible light here means light with wavelength of 400-750 nm, and the heat-ray means light with wavelength of 800-1110 nm.

FIG. 1 is a schematic view illustrating an example of the agricultural greenhouse to explain the agricultural greenhouse or the heat-ray reflecting film structure of the present invention. Reference number 3 expresses a heat-ray shielding means in an explanation of the agricultural greenhouse of the present invention, and also expresses the heat-ray reflecting film structure in an explanation of the heat-ray reflecting film structure of the present invention.

In the agricultural greenhouse 1 utilizing sunlight, a heat-ray shielding means 3 is spread at an upper part and a $CO_2$ supply means 2 supplying carbon dioxide to an inside of the agricultural greenhouse 1 and a dehumidification and cooling means 4 cooling the inside of the agricultural greenhouse 1 are provided at a lower part. In the agricultural greenhouse 1, the high concentration of carbon dioxide in the agricultural greenhouse 1 can be kept economically by closing the skylights 5 in the daytime, and the temperature in the agricultural greenhouse can be lowered by opening the skylights 5 in the night-time.

The heat-ray reflecting film structure of the present invention has following properties and structures;
1) it is formed of an original film in which a lubricity-attached layer is provided on at least one surface of a multi-layer laminated film obtained by laminating at least two kinds of resin layers with different refractive indices alternately and having an average transmittance at 80% or more for visible light and an average reflectance at 70% or more for heat-ray,
2) it is a woven or knitted fabric in which a narrow band-shaped tape obtained by cutting the original film as a warp or a weft and a filament yarn and the like as a weft or a warp are woven or knitted, and
3) in the woven or knitted fabric, a thickness of the filament yarn and the like is set to be 0.01-0.30 times as thick as a width of the narrow band-shaped tape and intervals between the adjacent narrow band-shaped tapes are set to be 0.1-0.5 times the width of the narrow band-shaped tape.

In the agricultural greenhouse utilizing sunlight in which the heat-ray reflecting film structure of the present invention is provided, and the skylights are closed in the daytime and opened in the night-time, for example, a resin plate such as "Sunny Coat" is not provided. Therefore, it has following excellent points compared to the aforementioned agricultural greenhouse.
1) The transmittance of visible light which is necessary for the plant growth can be enhanced (in the aforementioned agricultural greenhouse in which "Sunny Coat" is provided, the transmittance of light of 400-700 nm which is necessary for the plant growth is about 70% at most, which is low rate, as mentioned above).
2) Facility cost of the agricultural greenhouse can be reduced.
3) Problems such as discoloration and deterioration of fruits, leaves and flowers of the plants due to condensation occurred on a lower surface of the heat-ray shielding means and dropped on the plants do not occur, when a difference of temperature between the cultivation part and the ceiling part becomes large in the night-time, particularly early in the morning.

In the aforementioned agricultural greenhouse, "near-infrared ray absorbing film" is used in order to shield the heat-ray. However, such a heat-ray absorbing type film itself generates heat by absorbing the heat-ray and the temperature in the agricultural greenhouse rises. On the other hand, the heat-ray reflecting film structure of the present invention uses a heat-ray reflecting type film called "multi-layer laminated film with an average reflectance at 70% or more for heat-ray (light with wavelength of 800-1100 nm)". Therefore, the temperature in the agricultural greenhouse does not rise easily.

Next, the properties and structures of the heat-ray reflecting film structure of the present invention is explained in series.

<Agricultural Greenhouse to be Applied>

The agricultural greenhouse of the present invention to which the heat-ray reflecting film structure of the present invention is applied utilizes sunlight. When artificial light such as LED is used, an amount of light energy, which is a driving source of photosynthesis, can be adjusted and controlled. However, it is not suitable for mass production of the plants since irradiation energy is necessary.

In a general agricultural greenhouse utilizing sunlight, since the temperature in the agricultural greenhouse rises due to the heat-ray included in sunlight, it is necessary that the temperature in the agricultural greenhouse is kept to be suitable by natural ventilation or forcible air blow and the like. However, ventilation requires labor and cost, and tends to cause pests to enter into the agricultural greenhouse.

In the agricultural greenhouse in which the concentration of carbon dioxide is kept high, it is necessary that ventilation rate is kept low so as not carbon dioxide to be released to an outside as much as possible. For this purpose, the large agricultural greenhouse has to be kept at a suitable temperature by operating cooling facilities in the daytime, and a huge amount of energy for cooling is needed.

In the agricultural greenhouse utilizing sunlight to which the heat-ray reflecting film structure is applied, it is favorable that the agricultural greenhouse is in a sealed state by closing the skylights provided on the ceiling part in the daytime when photosynthesis is actively performed; the temperature, the concentration of carbon dioxide and the humidity in the agricultural greenhouse is kept and controlled within a range where photosynthesis is actively performed, and in the night-time when photosynthesis is not actively performed, the temperature in the agricultural greenhouse is lowered by opening the skylights provided on the ceiling part for an upcoming rise of the temperature in the next daytime. By using the heat-ray reflecting film structure having specific structures and properties, the plants can be economically and efficiently cultivated.

<Multi-Layer Laminated Film>

The first characteristic of the heat-ray reflecting film structure of the present invention is that it is formed using a heat-ray reflecting type multi-layer laminated film used in the field of optical interference filter and laminated glasses instead of films reflecting not only heat-ray but also visible light by a metal in a metal deposited layer, a metal foil, or a metal containing layer as used for general agricultural greenhouses.

Specifically, the multi-layer laminated film has a high average transmittance at 80% or more for visible light and a high average reflectance at 70% or more for heat-ray.

By using the multi-layer laminated film with high average reflectance at 80% or more for visible light, visible light as a driving source of photosynthesis can be sufficiently supplied to the plants, thereby the plant growth can be sufficiently promoted.

Also by using the multi-layer laminated film with high average reflectance at 70% or more for heat-ray, the heat-ray which raises the temperature in the agricultural greenhouse can be sufficiently shielded. Further, since the film itself is less likely to generate heat as in a case of the heat-ray absorbing film, the rise of the temperature in the agricultural greenhouse can be suppressed and cost necessary for the dehumidification and cooling can be reduced.

As a material film having high average transmittance for visible light and high average reflectance for heat-ray, the multi-layer laminated film described in the Patent Documents listed in the item [heat-ray reflecting film] of the above <heat-ray shielding means> can be favorably used.

The multi-layer laminated films are the ones made by laminating at least two kinds of resin layers with different refractive indices alternately, and can transmit visible light and reflect heat-ray selectively in sunlight. In order to transmit visible light and reflect heat-ray selectively by the multi-layer laminated film properly, it is preferable that a difference of average refractive indices between the two kinds of resin layers in an in-plane direction is at least 0.03. Further, it is preferable that the multi-layer laminated film has at least 101 layers of resin layers having an optical thickness of 150-400 nm, and preferably 200-300 nm.

The multi-layer laminated film used for the heat-ray reflecting film structure of the present invention is not limited in particular as far as it has the above characteristics. However, it is preferable that at least two kinds of resin layers with different refractive indices are laminated alternately. Regarding a reflection by alternate lamination of resin layers with different refractive indices, reflection wavelength can be designed with an optical thickness of the resin layer (refractive index×thickness) and reflectance can be designed with a total number of resin layers and with a difference of refractive indices between the resin layers. Selection of the resin, thickness of resin layers and the number of layers to be laminated can be adjusted so as to have a desired reflection property.

The resins forming the resin layers of the multi-layer laminated film are the same as the ones forming the resin layers of the multi-layer laminated film described in the item [heat-ray reflecting film] of the above <heat-ray shielding means>. Further, the resin used for resin layers with high refractive index and the resin used for resin layers with low refractive index are also the same as the ones described in the item [heat-ray reflecting film] of the above <heat-ray shielding means> respectively.

<Woven or Knitted Fabric with Lubricity-Attached Layer>

In the present invention, since the lubricity-attached layer is further provided on at least one side surface and preferably on both surfaces of the multi-layer laminated film, the weaving or knitting can be smoothly and homogeneously performed with the narrow band-shaped tape obtained by cutting the multi-layer laminated film as a warp or a weft and the filament thread and the like as a weft or a warp. In a case that the lubricity-attached layer is not provided, blocking may occur between the narrow band-shaped tapes during storage, or the narrow band-shaped tapes can not be conveyed smoothly in a loom at the time of weaving or knitting, thereby it may cause inconvenience such that weaving or knitting can not smoothly performed or weaving or knitting can not be homogeneously performed.

The lubricity-attached layer can be formed by applying a resin layer including fine particles with an average particle diameter of 0.05-0.5 µm or lubricant such as wax or by laminating by co-extrusion to the multi-layer laminated film.

Examples for the fine particles are as follows; organic fine particles such as polystyrene, polymethyl methacrylate, methyl methacrylate copolymer, methyl methacrylate cross-linked copolymer, polytetrafluoroethylene, polyvinylidene fluoride, polyacrylonitrile, benzoguanamine resin, a core-shell type particle in which an outer shell of polystyrene particle is covered with acrylic resin, or inorganic fine particles such as silica, aluminum oxide, titanium dioxide, kaolin, talc, graphite, calcium carbonate, feldspar, molybdenum disulfide, carbon black, barium sulfate. Among the above, the organic fine particles are preferable.

When an average particle diameter of the fine particle is smaller than 0.05 µm, lubricity of the film is not sufficient depending on an amount of particles. On the other hand, when an average particle diameter of the fine particle is larger than 0.5 µm, a dropping of the particle from the coating film occurs, which is not preferable since.

In the following, a case of applying is explained as an example.

As examples of a binder fixing the fine particles are listed as follows; alkyd resin, unsaturated polyester resin, saturated polyester resin, phenolic resin, amino resins, vinyl acetate resin, vinyl chloride-vinyl acetate resin, acrylic resin and acrylic-polyester resin. The resins may be a homopolymer, copolymer, or mixture.

It is preferable that a ratio between the fine particles and coat-forming resin (binder) is set depending on a design of property of coat surface. It is preferable that the fine particles are 0.1-40 mass % and the coat-forming resin (binder) to be a binding agent is 60-99.9 mass % with respect to total coat-forming content. When the fine particles are too little, homogeneous and predetermined amount of protrusions can not be applied to the coat, and when the fine particles are too much, dispersibility worsens and homogeneous and predetermined amount of protrusions is hard to be applied. When the coat-forming resin of the binder is too little, an adhesion of the coat to the polyester film is lowered, and when too much, blocking resistance is lowered.

As a method of providing the lubricity-attached layer to the multi-layer laminated film, the following method can be adopted; a method applying coating liquid containing the fine particles and the coat-forming resin and preferably aqueous coating liquid to a surface of the film before crystal orientation is finished in a manufacturing step of the multi-layer laminated film, drying and solidifying (in-line-coating method), or a method applying resin coating liquid containing the fine particles to the biaxially oriented multi-layer laminated film, drying and solidifying. However, the former method is preferable. Particularly, it is preferable that the aqueous coating liquid is applied to the surface of the longitudinal stretching multi-layer laminated film, then it is dried and transverse stretching processed.

Here, the multi-layer laminated film before crystal orientation is finished includes an unstretched film obtained by melt extruding the film and rapidly cooling and solidifying, an uniaxially stretched film obtained by orienting the unstretched film in one of a longitudinal direction or a transverse direction, and further, a biaxially stretched film stretching in a biaxial direction but at least one direction is a low-ratio stretching and further stretching orientation in the direction is required (the biaxially stretched film before oriented crystallization is finished which finally stretched in the longitudinal and/or transverse direction again).

As coating method, known and arbitral ones can be applied. For example, a roll coat method, a gravure coat method, a roll brushing method, a spray coat method, an air knife coat method, an impregnation method and a curtain coat method may be adopted alone or combined. Regarding co-extrusion, known method can be adopted by itself.

<Woven or Knitted Fabric>

The second characteristic of the heat-ray reflecting film structure of the present invention is to make it a woven or knitted fabric which is woven or knitted using a narrow band-shaped tape obtained by cutting an original film provided with the lubricity-attached layer on at least one surface, preferably both surfaces of the multi-layer laminated film as a warp or a weft, and using the filament thread and the like as a weft or a warp.

As above, not by using the multi-layer laminated film as a film as it is, but by using it as a woven or knitted fabric obtained by weaving or knitting the narrow band-shaped tape obtained by cutting the original film in which the lubricity-attached layer is provided on a surface of the multi-layer laminated film as a warp or a weft, mechanical strength of the heat-ray reflecting film structure such as winding property, blocking resistance, tear resistance and durability can be excellent.

Further, since the heat-ray reflecting film structure of the present invention is a woven or knitted fabric, air permeability can be secured by openings formed between the narrow band-shaped tapes and the filament yarns and the like. Thus, since the heat-ray reflecting film structure of the present invention has excellent air permeability compared to a case using the film as it is, problems can be prevented such as discoloration and deterioration of fruits, leaves and flowers of the plants due to condensation occurred on a lower surface of the heat-ray shielding means and dropped on the plants when a difference of temperature becomes large between the cultivation part and the ceiling part in the night-time, particularly early in the morning.

Further, in a case of using the multi-layer laminated film as it is, the cases may occur that the ultraviolet is shielded excessively, and problems may occur that fruits such as eggplants are not colored sufficiently when they are grown, or pollination activity is not performed in a normal way because bees do not approach flowers sufficiently in the agricultural greenhouse. However, since the openings are formed in the heat-ray reflecting film structure of the present invention, an adverse effect due to the excessive shielding of the ultraviolet as above can be avoided.

<Aspect of Aperture>

The third characteristic of the heat-ray reflecting film structure of the present invention is to set a thickness of the filament yarn and the like to be 0.01-0.30 times as thick as the width of the narrow band-shaped tape and intervals between the adjacent narrow band-shaped tapes to be 0.1-0.5 times the width of the narrow band-shaped tapes in the woven or knitted fabric. "Filament yarns and the like" means a filament yarn or a spun yarn. As a filament yarn in the present invention, both monofilament yarn and multi filament yarn can be used, and there is not a limit in particular.

Figure 3:
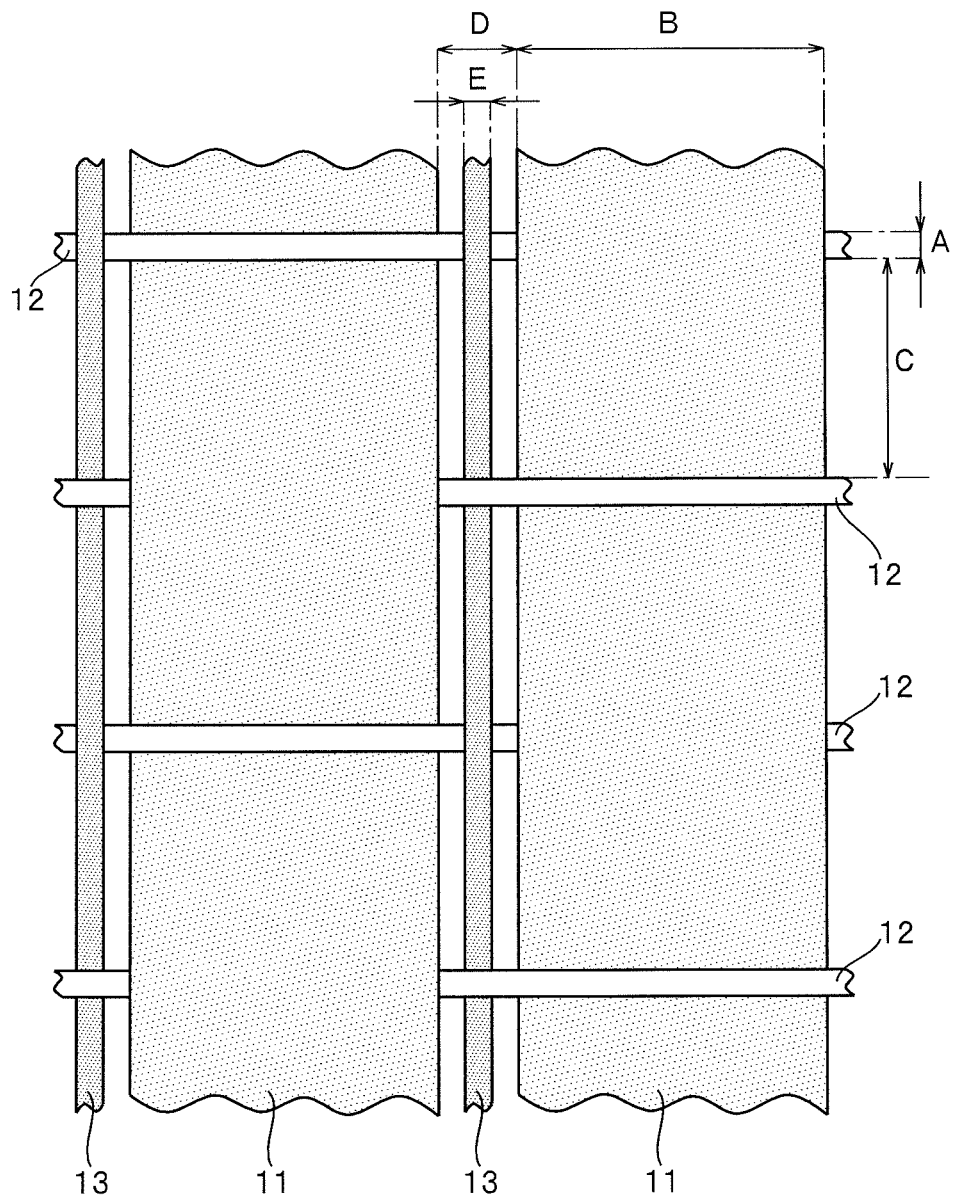
FIG. 3 is a front view illustrating a part of one Embodiment of the heat-ray reflecting film structure of the present invention.
Figure 4:
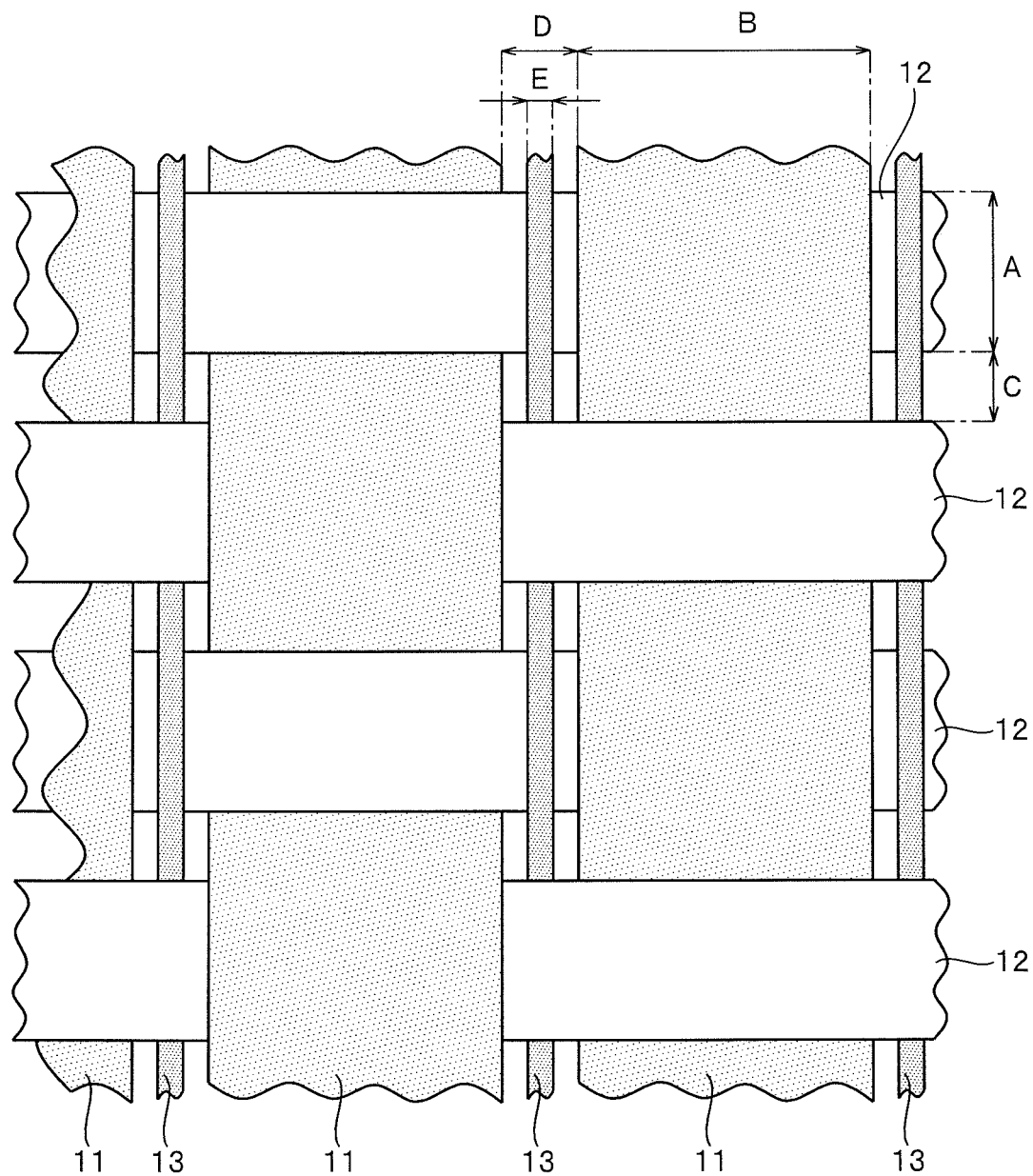
FIG. 4 is a front view illustrating a part of another Embodiment of the heat-ray reflecting film structure of the present invention.

As shown in FIGS. 3 and 4, the heat-ray reflecting film structure obtained by weaving a narrow band-shaped tape (warp) 11 obtained by cutting (slitting) the multi-layer laminated film into a narrow band shape with filament yarns and the like (weft) 12 can be listed as an example. Explaining using the Figures, a thickness A of the filament yarns and the like (weft) 12, a width B of the narrow band-shaped tape (warp) 11, an interval C between the adjacent filament yarns and the like (weft) 12 and an interval D between the adjacent narrow band-shaped tapes (warp) 11 are set to be in a particular range, thereby an aperture ratio of the heat-ray reflecting film structure is made to be in a proper range, and ultraviolet transmittance is made to be in a proper range while securing high transmittance for visible light and high reflectance for heat-ray not inferior to a case of using the multi-layer laminated film as it is.

Specifically, in the woven or knitted fabric, a thickness of the filament yarn and the like (weft) 12 is set to be 0.01-0.30 times as thick as a width of the narrow band-shaped tape (warp) 11, and intervals between the adjacent narrow band-shaped tapes (warp) 11 are set to be 0.1-0.5 times the width of the narrow band-shaped tape (warp) 11, thereby an aperture ratio of the heat-ray reflecting film structure is made to be in a proper range, and ultraviolet transmittance is made to be in a proper range while securing high transmittance for visible light and high reflectance for heat-ray not inferior to a case of using the multi-layer laminated film as it is. It is preferable that the interval between the adjacent filament yarns and the like (weft) 12 is set in a range of 1.0-10 mm in light of an effect of the present invention.

The width of the narrow band-shaped tape (warp) 11 is preferably 1-10 mm, more preferably 2-6 mm and further preferably 3-5 mm. The interval of the narrow band-shaped tapes (warp) 11, that is, a distance between end edges of the adjacent narrow band-shaped tapes (warp) 11 is preferably 0.2-1.0 mm, more preferably 0.4-0.8 mm, and further preferably 0.5-0.7 mm. The thickness of the filament yarn and the like (weft) 12 is preferably 0.05-0.35 mm, more preferably 0.1-0.3 mm, and further preferably 0.15-0.25 mm. In the heat-ray reflecting film structure of the present invention, the width of the narrow band-shaped tape, the thickness of the filament yarns and the like, the interval between the adjacent filament yarns and the like and the interval between the adjacent narrow band-shaped tapes are set as above, thereby an aperture ratio of the heat-ray reflecting film structure is made to be in a proper range, and ultraviolet transmittance is made to be in a proper range while securing high transmittance for visible light and high reflectance for heat-ray not inferior to a case of using the multi-layer laminated film as it is.

It is preferable that the ultraviolet transmittance of the heat-ray reflecting film structure is set to be 7-21%. When the ultraviolet transmittance is 7% or higher, it is preferable since problems are less likely to occur that fruits such as eggplants are not colored sufficiently when they are grown, or pollination activity is not performed in a normal way because bees do not approach to the flowers sufficiently in the agricultural greenhouse. When the ultraviolet transmittance is 21% or lower, it is preferable that problems such as inhibition of the plant growth are less likely to occur.

It is preferable that the aperture ratio of the heat-ray reflecting film structure is set to be 10-30%. An "aperture ratio" of the present invention is obtained as follows; making a part where a back surface side can be seen without interference in a case that a surface of 10 cm-by-10 cm square part (area of 100 $cm^2$) is in one surface of the heat-ray reflecting film structure is observed from a vertical direction to the surface to be an aperture; total (S $cm^2$) of an area of the aperture (aperture area) is obtained; then the aperture ratio is calculated by a formula: $[S(cm^2)/100(cm^2)] \times 100$.

In the heat-ray reflecting film structure, when an aperture ratio is 10% or higher, air permeability of the heat-ray reflecting film structure can be good, and air at a lower part of the agricultural greenhouse heated in the daytime can be released to an outside via the heat-ray reflecting film structure in a case that the temperature in the agricultural greenhouse is lowered for an upcoming rise of the temperature in the next daytime by opening the skylights provided on the ceiling part in the night-time when photosynthesis is not performed. Further, even in a case that air in an upper part close to a roof is cooled in the night-time, particularly early in the morning, it is preferable since quality deterioration such as discoloration and deterioration of fruits, leaves and flowers of the plants due to condensation occurred on a lower surface of the film and dropped on the plants or deterioration of the heat-ray reflecting film itself can be prevented. Moreover, when an aperture ratio is 30% or lower, it is preferable since the high transmittance for visible light and the high reflectance for heat-ray by the multi-layer laminated film can be secured.

<Ultraviolet Absorbing Layer>

Since the agricultural film such as a heat-ray reflecting film structure of the present invention is exposed to sunlight in the daytime, it is preferable that an ultraviolet absorbing layer is provided on at least one surface to prevent deterioration by the ultraviolet.

In a case that the resin layer having high refractive index of the multi-layer laminated film composing the heat-ray reflecting film structure is formed of a resin having a condensed aromatic ring such as naphthalene ring, it is particularly effective to provide an ultraviolet absorbing layer since the resin layer tends to be deteriorated by ultraviolet. Since the heat-ray reflecting film structure of the present invention is not a film as it is but provided with the aforementioned opening part, deterioration of the heat-ray reflecting film structure itself can be suppressed while transmitting necessary ultraviolet even in a case of providing such an ultraviolet absorbing layer.

It is preferable that a thickness of the ultraviolet absorbing layer is set to be 1-5 μm. It is preferable that the thickness of the ultraviolet absorbing layer is 1 μm or larger since deterioration of the resin layer can be sufficiently prevented. Further, it is preferable that the thickness of the ultraviolet absorbing layer is 5 μm or smaller since deterioration of the resin layer can be economically, efficiently and sufficiently prevented.

The ultraviolet absorber contained in the ultraviolet absorbing layer, and the method for providing the binder resin and the ultraviolet absorbing layer are the same as the description in the item [ultraviolet absorbing layer] of the above <heat-ray shielding means>.

<Function and Effect>

Since the heat-ray reflecting film structure of the present invention is formed using a multi-layer laminated film with high transmittance for visible light and high reflectance for heat-ray. Therefore, it is excellent since the rise of the temperature in the agricultural greenhouse can be suppressed without inhibiting the plant growth.

The heat-ray reflecting film structure of the present invention is a woven or knitted fabric obtained by weaving or knitting a narrow band-shaped tape obtained by cutting the original film in which the lubricity-attached layer is provided on the surface of the multi-layer laminated film as a warp or a weft, and the filament yarn and the like as a weft or a warp. Therefore, it is excellent since the weaving or knitting can be smoothly and homogeneously performed, mechanical strength such as winding property, blocking resistance, tear resistance and durability can be good compared to a case of using a multi-layer laminated film as it is, and air permeability can be secured by openings formed between the narrow band-shaped tapes and filament yarns and the like.

Further, the heat-ray reflecting film structure of the present invention is excellent since the thickness of the filament yarns and the like, the width of the narrow band-shaped tape, the interval between the adjacent filament yarns and the like and the interval between the adjacent narrow band-shaped tapes are set to be in a particular range, thereby an aperture ratio of the heat-ray reflecting film structure is made to be in a proper range, and ultraviolet transmittance is made to be in a proper range while securing the high transmittance for visible light and the reflectance for heat-ray not inferior to a case of using the multi-layer laminated film as it is.

EXAMPLES

Hereinafter, showing Examples and Comparative Examples, the agricultural greenhouse of the present invention and the plant cultivation method using the agricultural greenhouse is explained in more detail.

<Heat-Ray Shielding Film>

A rise of the temperature in the agricultural greenhouse was compared between a case using a heat-ray reflecting type film (hereinafter, "film A") as a heat-ray shielding film and a case using a heat-ray absorbing type film (hereinafter, "film B") as a heat-ray shielding film.

As film A, a film having the following structure and properties was used.

a biaxially stretched laminated polyester film having a laminated part in which a first layer (PEN resin, 137 layers) and a second layer (PETG resin, 138 layers) are laminated alternately, and in which protection layers (PEN resin, 2 layers) are provided on both surfaces of the laminated part, PEN resin: polyethylene-2,6-naphthalate having an intrinsic viscosity (Orthochlorophenol, 35° C.) of 0.62 dl/g, PETG resin: cyclohexanedimethanol copolymerized polyethylene terephthalate having an intrinsic viscosity (Orthochlorophenol, 35° C.) of 0.77 dl/g copolymerizing 30 mol % of cyclohexanedimethanol, thickness of laminated part: 40 μm, thickness of each protection layer: 5 μm, total thickness: 50 μm, adjusting the thickness of the first layer and the second layer so as to be an equal ratio of optical thickness of the first layer and the second layer of the laminated part, and average transmittance: 88%, average reflectance for heat-ray: 75%

As film B, a commercially available heat-ray absorbing type film (Product name "Megacool", manufactured by Mitsubishi Plastics Agri Dream Co. Ltd.) was used.

Figure 6:
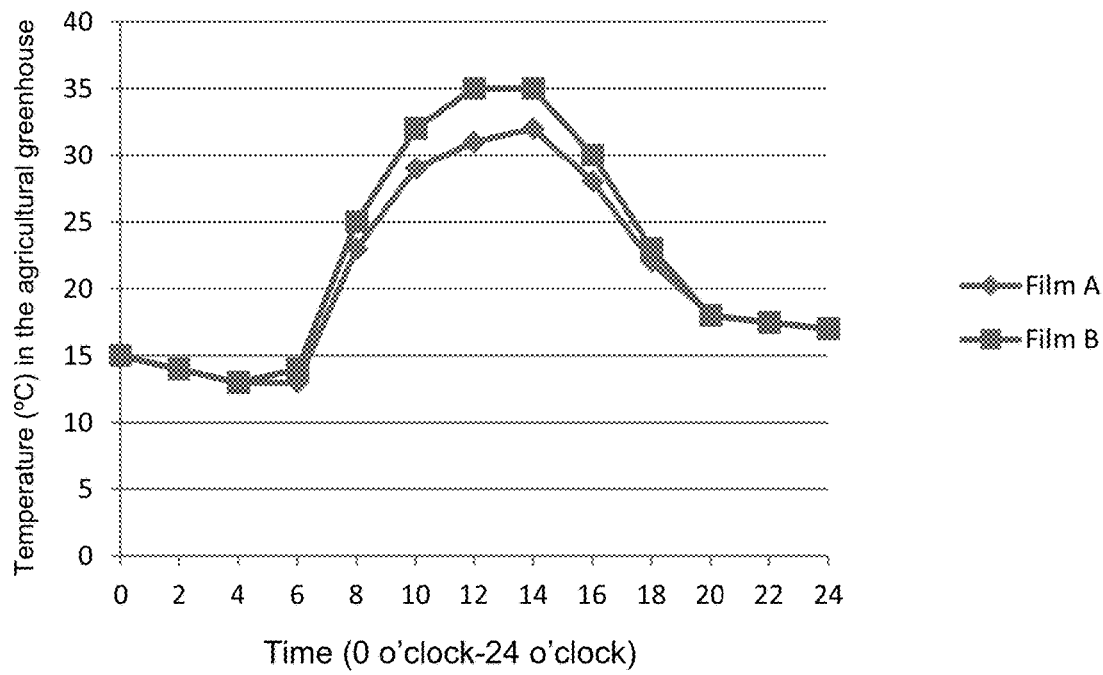
FIG. 6 is a graph of temperature in the agricultural greenhouse vs. time.

Film A and film B were spread at an upper part of the agricultural greenhouse sealed by closing the skylights, then the temperature in the agricultural greenhouse was measured. The result is shown in FIG. 6. The vertical axis of the graph in FIG. 6 expresses the temperature (° C.) in the agricultural greenhouse, and the horizontal axis expresses the time (0 o'clock-24 o'clock).

As known from FIG. 6, the heat-ray reflecting type film such as film A is used as the heat-ray shielding film used for the agricultural greenhouse utilizing sunlight, thereby a rise of the temperature in the sealed agricultural greenhouse can be suppressed compared to a case of using the heat-ray absorbing film such as film B.

Examples 1-5, Comparative Examples 1-2

The heat-ray shielding means is produced using film A as below and the properties are investigated. The result is shown in Table 1.

1) the Heat-Ray Shielding Means in Examples 1-3 and Comparative Examples 2

The narrow band-shaped tape obtained by cutting film A was set on the loom as a warp and a transparent thread was weft inserted, and woven, thereby the heat-ray shielding means as shown in FIG. 2 (a) was produced.

Specifically, film A was slit-processed and a flat yarn with a width in a short direction of 4.5 mm was produced. Then, the heat-ray shielding means was woven by the loom to make the flat yarn as a warp and a monofilament made of high-density polyethylene resin (fineness: 550 dtex, pulling strength: 29 N/number, draw ratio: 35%) as a weft.

By adjusting the interval of the flat yarns as a warp, the heat-ray shielding means having an aperture ratio as shown in Table 1 was obtained.

2) Heat-Ray Shielding Means in Example 4

The heat-ray shielding means was woven by the loom in a same manner as Example 1 except that a flat yarn (flat yarn a) obtained from film A as well as the same-shaped flat yarn (flat yarn b) obtained from polyethylene film were used as flat yarns and one flat yarn b is disposed per 10 flat yarns a as a warp.

3) Heat-Ray Shielding Means in Example 5 and Comparative Example 1

In Example 5, film A in which same circular through holes are drilled at an equal interval to have an aperture ratio at 3% was used as the heat-ray shielding means.

In Comparative Example 1, film A was used as it is as the heat-ray shielding means.

the obtained transmittance curve and according to JIS R 3106:1998, an average transmittance for visible light and an ultraviolet transmittance were calculated.

(2) Average Reflectance for Heat-Ray (Wavelength: 800-1100 nm)

A relative specular reflectance with an aluminum-evaporated mirror was measured at each wavelength within a range of 800 nm-1100 nm using a spectrophotometer (manufactured by Shimazu Corporation, MPC-3100). From the measured reflectance curve, an average reflectance for heat-ray was calculated.

Manufacturing Example 1: Manufacture of the Multi-Layer Laminated Film a

The multi-layer laminated film A was manufactured by the same method as the one shown in Example 1 in JP2014-228837A.

Polyethylene-2,6-naphthalate (hereinafter "PEN") having an intrinsic viscosity (Orthochlorophenol, 35° C.) of 0.62 dl/g as a polyester for the first layer and also for the

TABLE 1

| | Physical properties of Film A | | Structure of heat-ray shielding means | | Properties of heat-ray shielding means | |
|---|---|---|---|---|---|---|
| | Transmittance for visible light (%) | Reflectance for heat-ray (%) | Configuration | Aaperture Ratio (%) | Air Permiability | Ultraviolet Transmittance (%) |
| Example 1 (Woven fabric using a flat yarn of film A as a warp) | 88 | 75 | Woven fabric | 3 | ○ | 5 |
| Example 2 (Woven fabric using a flat yarn of film A as a warp) | 88 | 75 | Woven fabric | 1 | ○ | 3 |
| Example 3 (Woven fabric using a flat yarn of film A as a warp) | 88 | 75 | Woven fabric | 9 | ○ | 8 |
| Example 4 (Woven fabric using a flat yarn of film A and a flat yarn of polyethylene film as a warp) | 88 | 75 | Woven fabric | 3 | ○ | 10 |
| Example 5 (through holes drilled on film A) | 88 | 75 | Film | 3 | ○ | 5 |
| Comparative Example 1 (film A used as it is) | 88 | 75 | Film | 0 | X | 0.5 |
| Comparative Example 2 (Woven fabric using a flat yarn of film A as a warp) | 88 | 75 | Woven fabric | 15 | ◉ | 15 |

As known from Table 1, by using the heat-ray reflecting film such as film A and providing appropriate openings, the heat-ray shielding means can be formed to have air permeability and an appropriate ultraviolet transmittance. Further, it has a woven or knitted structure, thereby the heat-ray shielding means can be excellent in winding property, blocking resistance, tear resistance and durability.

Hereinafter, showing Examples and Comparative Examples, the heat-ray reflecting film structure of the present invention is explained in more detail. Physical properties and properties in Examples were measured and evaluated by the following method:

(1) Average Transmittance for Visible Light (Wavelength: 400-750 nm) and Ultraviolet Transmittance (Wavelength; 350 nm)

A relative specular reflectance with an aluminum-evaporated mirror was measured at each wavelength within a range of 300 nm-2,100 nm using a spectrophotometer (manufactured by Shimazu Corporation, MPC-3100). From protection layer, and cyclohexanedimethanol copolymerized polyethylene terephthalate (hereinafter "PETG") copolymerizing 30 mol % of cyclohexanedimethanol and having an intrinsic viscosity (Orthochlorophenol, 35° C.) of 0.77 dl/g as a polyester for the second layer are respectively prepared.

The polyester for the first layer and the protection layer was dried at 180° C. for 5 hours and the polyester for the second layer was dried at 60° C. for 12 hours, and thereafter they were supplied to an extruder, then PEN was heated at 300° C. and PETG was heated at 270° C. to be in a molten state. After the polyester for the first layer was branched into 137 layers and the polyester for the second layer was branched into 138 layers, a laminated structure part in which a ratio between a maximum thickness and a minimum thickness in the first layer and the second layer respectively changes continuously to the maximum rate/minimum rate at 1.4 times and the protection layers laminated on both surfaces of the laminated structure part are laminated using a multi-layer feed blocking apparatus. Then, they are introduced to a die while maintaining the laminated state, and casted on a casting drum. Finally, an unstretched multi-layer laminated film having protection layers made of PEN layer on the outermost layers on both surfaces of the film and in which a total number of layers of the laminated structure part is 275 layers was produced.

The unstretched multi-layer laminated film obtained as above was preheated at 120° C., further heated by IR heater at 900° C. distanced at 15 mm above between a low-speed and high-speed rolls, and drawn at 3.5 times in a longitudinal direction. Then, it was supplied to a tenter and drawn at 4.5 times in a transverse direction at 145° C. The obtained biaxially oriented multi-layer laminated film was heat set for 30 seconds at 180° C., thereby the multi-layer laminated film A was manufactured.

The obtained multi-layer laminated film A has a total thickness of 50 μm, and in which thickness of the protection layers on a top surface and a back surface is 5 μm, and an optical thickness ratio between the first layer and the second layer of the laminated part excluding the protection layer is equal. These thicknesses can be adjusted by adjusting a supply amount and a discharging amount of the first layer and the second layer. An average transmittance for visible light of the obtained laminated film A is 89% and an average reflectance for heat-ray is 75%.

Manufacturing Example 2: Manufacture of Multi-Layer Laminated Film B

The multi-layer laminated film B was manufactured in a same manner as in the manufacturing example 1 except that a coating liquid of the following composition (lubricity-attaching coating liquid) was applied on both surfaces of the multi-layer laminated film after drawing in the longitudinal direction but before drawing in the transverse direction in the manufacturing method 1 by a roll-coat method so as an applied thickness to be 3 μm, then drying, and drawing in the transverse direction.

The composition of the coating liquid is; 1.0 wt % solution of acrylic-polyester resin (manufactured by Takamatsu-oil & fat Co, Ltd. IN-170-6): 76.9 unit, 1.0 wt % solution of Polymethyl methacrylate fine particles (an average particle diameter is 0.06 μm): 3.1 unit, 1.0 wt % solution of Polyoxyethylene nonylphenyl ether (manufactured by Nippon Oil and Fats Co, Ltd. NS208.5): 2.0 unit, and 1.0 wt % solution of Polyoxyethylene nonylphenyl ether (manufactured by Nippon Oil and Fats Co, Ltd. NS240): 18.0 unit, and the applying amount is 2.7 g/m² in a wet state.

Manufacturing Example 3: Manufacturing the Multi-Layer Laminated Film C

The multi-layer laminated film C was manufactured in a same manner as in the manufacturing example 2 except that OBLIGATO PW202 (fluorine resin containing ultraviolet absorber manufactured by AGC coat-tec Co, Ltd.) was applied on one surface of the multi-layer laminated film after drawing in the transverse direction using a wire-bar and a dry processing was conducted at 100° C. for 5 minutes continuously in the manufacturing method 2, thereby an ultraviolet absorbing layer with a film thickness of 1 μm is provided.

Examples 6-1 to 6-4

The heat-ray reflecting film structures in Examples 6-1 to 6-4 were manufactured as follows.

The narrow band-shaped tape was produced by cutting the multi-layer laminated film B (with lubricity-attached layer and without ultraviolet absorbing layer). Then, as shown in FIGS. 3 and 4, the narrow band-shaped tape was woven or knitted as a narrow band-shaped tape (warp) 11 with the monofilament yarn made of polyethylene as a filament yarn and the like (weft) 12 to be a heat-ray reflecting film structure.

At this time;
A width B of the narrow band-shaped tape (warp) 11 is a value shown in "Width of narrow band-shaped tape(B) [mm]" in Table 2,
A thickness A of the filament yarn and the like (weft) 12 is a value shown in "Thickness of monofilament yarn (A) [mm]" in Table 2,
An interval C of the adjacent filament yarns and the like (weft) 12 is a value shown in "Interval of monofilament yarns(C) [mm]" in Table 2,
An interval D of the adjacent narrow band-shaped tapes (warp) 11 is a value shown in "Interval of narrow band-shaped tapes(D) [mm]" in Table 2,
and the heat-ray reflecting film structures in Examples 6-1 to 6-4 was woven or knitted.

In the heat-ray reflecting film structures, "an interval between the adjacent filament yarns and the like", "magnification of a thickness of the filament yarns and the like with respect to a width of the narrow band-shaped tape" and "magnification of an interval between the adjacent narrow band-shaped tapes with respect to a width of the narrow band-shaped tape" are the values shown in "Interval of monofilament yarns(C) [mm]", "A/B" and "D/A" respectively.

Comparative Example 3

The heat-ray reflecting film structure was produced by weaving or knitting in a same manner as in Example 6-1 except that the multi-layer laminated film A (without lubricity-attached layer and ultraviolet absorbing layer) was used as a multi-layer laminated film. However, since a surface of the multi-layer laminated film A is far from smooth, tension in a step of cutting and producing the narrow band-shaped tape was significantly fluctuated, and it was cut or the width of the narrow band-shaped tape became inhomogeneous. As a result, a heat-ray reflecting film structure having homogeneous texture was not able to be obtained.

Comparative Example 4-1

The multi-layer laminated film B (with lubricity-attached layer and without ultraviolet absorbing layer) was used as a heat-ray reflecting film structure in Comparative Example 4-1 as it is without cutting, weaving or knitting.

Comparative Example 4-2

Weaving or knitting was performed in a same manner as in Example 6-1 to be the heat-ray reflecting film structure of Comparative Example 4-2 except that the monofilament yarn made of polyethylene with a thickness of 1.5 mm was used as a filament yarn and the like (weft) 12.

In the heat-ray reflecting film structure in Comparative example 4-2, "an interval between the adjacent filament yarns and the like", "magnification of a thickness of the filament yarn and the like with respect to a width of the narrow band-shaped tape" and "magnification of an interval between the adjacent narrow band-shaped tapes with respect to a width of the narrow band-shaped tape" are the values shown in "Interval of monofilament yarns(C) [mm]", "A/B" and "D/A" in Table 2 respectively.

Examples 7-1 to 7-4

Weaving or knitting was performed in a same manner as in Example 6-1 to be the heat-ray reflecting film structure in Example 7-1 except that the multi-layer laminated film C (with lubricity-attached layer and ultraviolet absorbing layer) was used as a multi-layer laminated film.

Further, in Examples 7-1 to 7-4,

A width B of the narrow band-shaped tape (warp) 11 is a value shown in "Width of narrow band-shaped tape(B) [mm]" in Table 3.

A thickness A of the filament yarn and the like (weft) 12 is a value shown in "Thickness of monofilament yarn (A) [mm]" in Table 3.

An interval C of the adjacent filament yarns and the like (weft) 12 is a value shown in "Interval of monofilament yarns (C) [mm]" in Table 3.

An interval D of the adjacent narrow band-shaped tapes (warp) 11 is a value shown in "Interval of narrow band-shaped tapes(D) [mm]" in Table 3.

and the heat-ray reflecting film structures in Examples 7-1 to 7-4 were produced.

In the heat-ray reflecting film structures, "an interval between the adjacent filament yarns and the like", "magnification of a thickness of the filament yarn and the like with respect to a width of the narrow band-shaped tape" and "magnification of an interval between the adjacent narrow band-shaped tapes with respect to a width of the narrow band-shaped tape" are the values shown in "Interval of monofilament yarns (C) [mm]", "A/B" and "D/A" in Table 3 respectively.

Comparative Example 5-1

The multi-layer laminated film C (with lubricity-attached layer and ultraviolet absorbing layer) was used as a heat-ray reflecting film structure in Comparative Example 5-1 as it is without cutting, weaving or knitting.

Comparative Example 5-2

Weaving or knitting was performed in a same manner as in Example 7-1 to be the heat-ray reflecting film structure in Comparative Example 5-2 except that the interval D between the adjacent narrow band-shaped tapes (warp) 11 was set to be 2.40 mm.

In the heat-ray reflecting film structure in Comparative Example 5-2, "an interval between the adjacent filament yarns and the like", "magnification of a thickness of the filament yarn and the like with respect to a width of the narrow band-shaped tape" and "magnification of an interval between the adjacent narrow band-shaped tapes with respect to a width of the narrow band-shaped tape" are the values shown in "Interval of monofilament yarns (C) [mm]", "A/B" and "D/A" in Table 3 respectively.

In Examples 6-1 to 6-4, Comparative Example 3 and Comparative Example 4-2, Examples 7-1 to 7-4 and Comparative Example 5-2, a filament yarn and the like (warp) 13 made of polyethylene with a thickness E (0.2 mm) is interposed as a warp between the adjacent narrow band-shaped tapes (warp) 11 in order to weave a narrow band-shaped tape (warp) 11 with a wide width firmly by using a weft yarn.

An average transmittance for visible light (light with wavelength of 400-750 nm), an average reflectance for heat-ray (light with wavelength of 800-1100 nm) and an ultraviolet (wavelength of 350 nm) transmittance in the heat-ray reflecting film structures in the above Examples and Comparative Examples were measured. The results are shown in Table 2 and Table 3.

TABLE 2

| Item | Example 6-1 | Example 6-2 | Example 6-3 | Example 6-4 | Comparative Example 3 | Comparative Example 4-1 | Comparative Example 4-2 |
|---|---|---|---|---|---|---|---|
| Multi-layer laminated film used | B | B | B | B | A | B | B |
| With/Without lubricity-attached layer | ○ | ○ | ○ | ○ | X | ○ | ○ |
| With/Without ultraviolet absorbing layer | X | X | X | X | X | X | X |
| Thickness of monofilament yarn (A) [mm] | 0.2 | 0.2 | 0.2 | 0.2 | 0.2 | ... | 1.5 |
| Width of narrow band-shaped tape (B) [mm] | 4 | 4 | 3 | 5 | 4 | ... | 4 |
| Interval of monofilament yarns (C) [mm] | 2 | 2 | 2 | 2 | 2 | ... | 2 |
| Interval of narrow band-shaped tapes (D) [mm] | 0.60 | 1.60 | 0.60 | 0.60 | 0.60 | ... | 0.60 |
| A/B | 0.05 | 0.05 | 0.07 | 0.04 | 0.05 | ... | 0.38 |
| D/A | 0.15 | 0.40 | 0.20 | 0.12 | 0.15 | ... | 0.15 |
| Aperture ratio | 12% | 26% | 15% | 10% | 12% | 0% | 7% |
| Average transmittance for visible light[*1] | 86 | 89 | 88 | 86 | | 88 | 65 |
| Average reflectance for heat-ray[*2] | 68 | 61 | 68 | 72 | | 81 | 74 |
| Ultraviolet transmittance[*3] | 16 | 21 | 14 | 11 | | 5 | 14 |

[*1]Average transmittance for light with wavelength of 400-750 nm
[*2]Average reflectance for light with wavelength of 800-1100 nm
[*3]Transmittance for light with wavelength of 350 nm

TABLE 3

| Item | Example 7-1 | Example 7-2 | Example 7-3 | Example 7-4 | Comparative Example 5-1 | Comparative Example 5-2 |
|---|---|---|---|---|---|---|
| Multi-layer laminated film used | C | C | C | C | C | C |
| With/Without lubricity-attached layer | ○ | ○ | ○ | ○ | ○ | ○ |
| With/Without ultraviolet absorbing layer | ○ | ○ | ○ | ○ | ○ | ○ |

TABLE 3-continued

| Item | Example 7-1 | Example 7-2 | Example 7-3 | Example 7-4 | Comparative Example 5-1 | Comparative Example 5-2 |
|---|---|---|---|---|---|---|
| Thickness of monofilament yarn (A) [mm] | 0.2 | 0.2 | 0.2 | 0.2 | . . . | 0.2 |
| Width of narrow band-shaped tape (B) [mm] | 4 | 4 | 3 | 5 | . . . | 4 |
| Interval of monofilament yarns (C) [mm] | 2 | 2 | 2 | 2 | . . . | 2 |
| Interval of narrow band-shaped tapes (D) [mm] | 0.60 | 1.60 | 0.60 | 0.60 | . . . | 2.40 |
| A/B | 0.05 | 0.05 | 0.07 | 0.04 | . . . | 0.05 |
| D/A | 0.15 | 0.40 | 0.20 | 0.12 | . . . | 0.60 |
| Aperture ratio | 12% | 26% | 15% | 10% | 0% | 34% |
| Average transmittance for visible light[*1] | 88 | 93 | 89 | 88 | 90 | 94 |
| Average reflectance for heat-ray[*2] | 69 | 58 | 67 | 71 | 78 | 52 |
| Ultraviolet transmittance[*3] | 8 | 17 | 10 | 7 | 1 | 22 |

[*1]Average transmittance for light with wavelength of 400-750 nm
[*2]Average reflectance for light with wavelength of 800-1100 nm
[*3]Transmittance for light with wavelength of 350 nm <Observation Based on Table 2>

As Comparative Example 3, in a case of using the multi-layer laminated film A in which a lubricity-attached layer is not provided, a surface of the multi-layer laminated film A is far from smooth. Therefore, tension in a step of cutting and producing the narrow band-shaped tape is significantly fluctuated, thereby it was cut or the width of the narrow band-shaped tape became inhomogeneous. As a result, a heat-ray reflecting film structure having homogeneous texture can not be obtained. Thus, an aperture ratio, an average transmittance for visible light, an average reflectance for heat-ray and an ultraviolet transmittance of the heat-ray reflecting film structure vary.

Also in a case of using the multi-layer laminated film B in which a lubricity-attached layer is provided, and when the multi-layer laminated film B is made to be a heat-ray reflecting film structure as it is without cutting, weaving or knitting as in Comparative Example 4-1, "an aperture ratio becomes 0%" as shown in Table 2. Therefore, air permeability can not be secured and problems occur such as discoloration and deterioration of fruits, leaves and flowers of the plants due to condensation occurred on a lower surface of the film and dropped on the plants when a difference of temperature becomes large between the cultivation part and the ceiling part in the night-time, particularly early in the morning. Further, since "the ultraviolet transmittance becomes 5%" as shown in Table 2, which is too small, problems may occur that fruits such as eggplants are less colored when they are grown, or pollination activity is not performed in a normal way because bees do not approach to the flowers sufficiently in the agricultural greenhouse.

Also in a case of using the multi-layer laminated film B in which a lubricity-attached layer is provided, and when using the filament yarn and the like with a thickness of 1.5 mm which is thick as in Comparative Example 4-2, "an aperture ratio becomes 7%" which is too small compared to Examples 6-1 to 6-4, as shown in Table 2. Therefore, an average transmittance for visible light becomes 65% which is too small.

The heat-ray reflecting film structure in Examples 6-1 to 6-4 using the multi-layer laminated film B can be woven or knitted smoothly and homogeneously compared to the heat-ray reflecting film structure in Comparative Example 3. Due to the above, it is excellent since variation of an aperture ratio, an average transmittance for visible light, an average reflectance for heat-ray and an ultraviolet transmittance for the heat-ray reflecting film structure is suppressed.

Further, the heat-ray reflecting film structures in Examples 6-1 to 6-4 are excellent in air permeability compared to the heat-ray reflecting film structure in Comparative Example 4-1. Therefore, problems can be prevented such as discoloration and deterioration of fruits, leaves and flowers of the plants due to condensation occurred on a lower surface of the heat-ray shielding means and dropped on the plants when a difference of temperature becomes large between the cultivation part and the ceiling part in the night-time, particularly early in the morning. Moreover, since ultraviolet is not excessively shielded, there is no fear of negative effects on coloring of fruits and pollination activity.

Further, the heat-ray reflecting film structures in Examples 6-1 to 6-4 can secure high average reflectance for heat-ray (61-72%) and high ultraviolet transmittance (11-21%) not inferior to the heat-ray reflecting film structure in Comparative Example 4-2 as well as the transmittance for visible light can be "86-89%" which is high.

<Observation Based on Table 3>

The heat-ray reflecting film structure shown in Table 3 is manufactured using the multi-layer laminated film C in which the lubricity-attached layer and the ultraviolet absorbing layer are provided. However, in a case that the multi-layer laminated film is made to be a heat-ray reflecting film structure as it is without cutting, weaving or knitting as in Comparative example 5-1, "an aperture ratio is 0%" as shown in Table 3. Therefore, air permeability can not be secured and problems occur such as discoloration and deterioration of fruits, leaves and flowers of the plants due to condensation occurred on a lower surface of the film and dropped on the plants when a difference of temperature becomes large between the cultivation part and the ceiling part in the night-time, particularly early in the morning. Further, since "the ultraviolet transmittance is 1%" as shown in Table 3, which is too small, problems may occur that fruits such as eggplants are less colored when they are grown, or pollination activity is not performed in a normal way because bees do not approach to the flowers sufficiently in the agricultural greenhouse.

In a case that the interval of the narrow band-shaped tape is made to be 2.40 mm, which is too wide, as in Comparative Example 5-2, "an aperture ratio is 34%" which is too large, compared to Examples 7-1 to 7-4 as shown in Table 3. Therefore, an average reflectance for heat-ray becomes 52%, which is too small.

The heat-ray reflecting film structures in Examples 7-1 to 7-4 using the multi-layer laminated film C can be woven or knitted smoothly and homogeneously compared to the heat-ray reflecting film structure in Comparative Example 3. Due to the above, it is excellent since variation of an aperture ratio, an average transmittance for visible light, an average reflectance for heat-ray and an ultraviolet transmittance for the heat-ray reflecting film structure is suppressed.

Further, the heat-ray reflecting film structures in Examples 7-1 to 7-4 are excellent in air permeability compared to the heat-ray reflecting film structure in Comparative Example 5-1. Therefore, problems can be suppressed such as discoloration and deterioration of fruits, leaves and flowers of the plants due to condensation occurred on a lower surface of the heat-ray shielding means and dropped on the plants when a difference of temperature becomes large between the cultivation part and the ceiling part in the night-time, particularly early in the morning. Moreover, since ultraviolet is not excessively shielded, there is no fear of negative effects on coloring of fruits and pollination activity.

Further, the heat-ray reflecting film structures in Examples 7-1 to 7-4 can secure high average transmittance for visible light (88-93%) and ultraviolet transmittance (7-17%) not inferior to the heat-ray reflecting film structure in Comparative Example 5-2 as well as the reflectance for heat-ray can be "58-71%" which is high.

Reference Example

Figure 7:
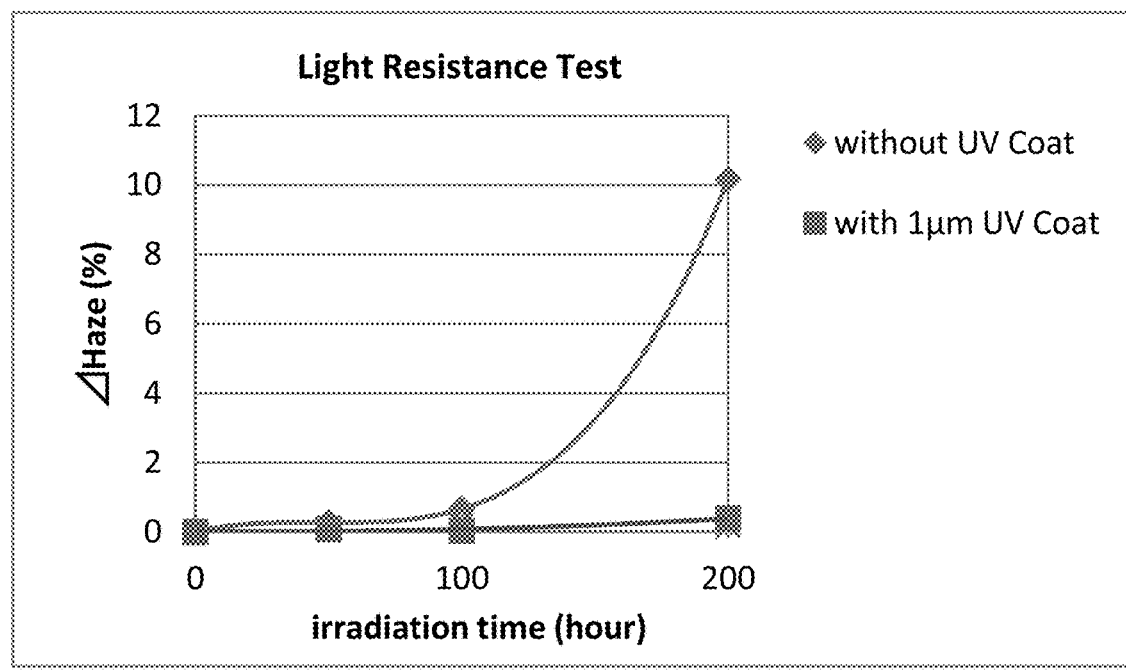
FIG. 7 is a graph of the change in haze vs. irradiation time.

1) A multi-layer laminated film A, and
2) A film in which an ultraviolet absorbing layer with a film thickness of 1 μm is provided by applying OBLIGATO PW202 (fluorine resin including ultraviolet absorber manufactured by AGC coat-tec Co, Ltd.) on one surface of the multi-layer laminated film A using a wire-bar and by conducting a dry processing at 100° C. for 5 minutes continuously, are prepared. Then, an exposure test (irradiance of 60 W/m$^2$, temperature of black panel: 63° C., exposure time: 200 hours by xenon weather meter) was conducted to the above films of 1) and 2), and a difference of haze value [ΔHaze (%)] was evaluated. The result is shown in FIG. 7.

With visual observation of the film after the exposure test, micro cracks occurred on a surface of the film of above 1) in which the ultraviolet absorbing layer is not provided. However, an appearance of the film of above 2) in which the ultraviolet absorbing layer is provided did not change so much.

Thus, in a case that a resin layer with high refractive index of the multi-layer laminated film composing the heat-ray reflecting film structure is formed of a resin having a condensed aromatic ring such as naphthalene ring, the resin layer tends to be deteriorated by ultraviolet. However, by providing the ultraviolet absorbing layer, ultraviolet deterioration of the film can be sufficiently prevented and usable term of the heat-ray reflecting film structure can be elongated.

The heat-ray reflecting film structure of the present invention is not a film as it is but a woven or knitted fabric weaving or knitting the narrow band-shaped tape obtained by cutting the film as a warp or a weft and the filament yarns and the like as a weft and a warp, and openings are provided. Therefore, also in a case of providing such an ultraviolet absorbing layer, the heat-ray reflecting film structure can be adjusted so as to suppress deterioration of the heat-ray reflecting film structure itself while transmitting necessary ultraviolet.

EXPLANATION OF REFERENCE NUMERALS

1: Agricultural greenhouse
2: $CO_2$ supply means
3: Heat-ray shielding means or heat-ray reflecting film structure
4: Dehumidification and cooling means
5: Skylight
7: Narrow band-shaped tape
8: Transparent thread
11: Narrow band-shaped tape (warp)
12: Filament yarn and the like (weft)
13: Filament yarn and the like (warp)
101: Ceiling part (of agricultural greenhouse)
102: Cultivation part (of agricultural greenhouse)
103: Sunny Coat
104: Near-infrared ray absorbing film
105: Skylight
106: $CO_2$ generator
107: Heat pump
108: Sunlight
A: Thickness of weft (filament yarn and the like)
B: Width of narrow band-shaped tape
C: Interval of wefts
D: Interval of narrow band-shaped tapes
E: Thickness of filament yarn and the like made of polyethylene

The invention claimed is:

1. A heat-ray reflecting film structure used for an agricultural greenhouse utilizing sunlight, wherein
    the heat-ray reflecting film structure is formed of a woven or knitted fabric weaving or knitting a narrow band-shaped tape as a warp or a weft and a filament yarn or a spun yarn as a weft or a warp, wherein the narrow band-shaped tape is obtained by cutting an original film in which a lubricity-attached layer is provided on at least one surface of a multi-layer laminated film made by laminating at least two kinds of resin layers with different refractive indices alternately and having an average transmittance at 80% or more for light with wavelength of 400-750 nm and an average reflectance at 70% or more for light with wavelength of 800-1100 nm, and
    a thickness of the filament yarn or the spun yarn is 0.01-0.30 times as thick as a width of the narrow band-shaped tape and intervals between the adjacent narrow band-shaped tapes are 0.1-0.5 times the width of the narrow band-shaped tape.

2. The heat-ray reflecting film structure according to claim 1, wherein an ultraviolet absorbing layer is provided on at least one surface of the multi-layer laminated film.

3. The heat-ray reflecting film structure according to claim 1, wherein the ultraviolet absorbing layer contains a binder resin and the binder resin is a fluorine resin.

4. The heat-ray reflecting film structure according to claim 1, wherein an aperture ratio of the heat-ray reflecting film structure is from 10% to 30%, and the transmittance of light with wavelength of 350 nm is from 7% to 21%.

5. The heat-ray reflecting film structure according to claim 1, wherein the resin layer having high refractive index of the multi-layer laminated film is a resin layer made of resin having a condensed aromatic ring.

6. The heat-ray reflecting film structure according to claim 1, wherein a difference of average refractive indices between the two kinds of resin layers of the multi-layer laminated film in an in-plane direction is at least 0.03.

7. The heat-ray reflecting film structure according to claim 1, wherein the multi-layer laminated film has at least 101 layers of resin layers with an optical thickness of 150-400 nm.

* * * * *